(12) United States Patent
Montojo et al.

(10) Patent No.: US 9,198,174 B2
(45) Date of Patent: Nov. 24, 2015

(54) SUPPORTING MULTIPLE ACCESS TECHNOLOGIES IN A WIRELESS ENVIRONMENT

(71) Applicant: QUALCOMM Incorporated, San Diego, CA (US)

(72) Inventors: Juan Montojo, Nuremberg (DE); Amir Farajidana, Sunnyvale, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 13/692,647

(22) Filed: Dec. 3, 2012

(65) Prior Publication Data

US 2013/0094462 A1 Apr. 18, 2013

Related U.S. Application Data

(63) Continuation of application No. 12/548,075, filed on Aug. 26, 2009, now Pat. No. 8,325,661.

(60) Provisional application No. 61/092,456, filed on Aug. 28, 2008.

(51) Int. Cl.
*H04W 72/04* (2009.01)
*H04W 28/02* (2009.01)
(Continued)

(52) U.S. Cl.
CPC .............. *H04W 72/042* (2013.01); *H04L 5/005* (2013.01); *H04L 5/0037* (2013.01);
(Continued)

(58) Field of Classification Search
CPC ..... H04W 72/04; H04W 88/08; H04W 76/00; H04W 84/08; H04W 76/02; H04J 3/16; H04J 3/1682; H04J 3/1694; H04J 9/00; H04L 29/06163; H04L 1/0001
USPC .............................. 370/329, 328, 338, 395.4
See application file for complete search history.

(56) References Cited

U.S. PATENT DOCUMENTS 5,528,664 A   6/1996  Slekys et al.
6,483,460 B2  11/2002 Stilp et al.
(Continued)

FOREIGN PATENT DOCUMENTS

CN    1391771 A    1/2003
GB    2431073 A    4/2007
(Continued)

OTHER PUBLICATIONS

3GPP TS 36.331 v8.2.0, "3rd Generation Partnership Project; Technical Specification Group Radio Access Network; Evolved Universal Terrestrial Radio Access (E-UTRA) Radio Resource Control (RRC); Protocol specification, Release 8" May 2008, Part 5.2.1.1 of p. 18.
(Continued)

*Primary Examiner* — Warner Wong
(74) *Attorney, Agent, or Firm* — Liem T. Do

(57) ABSTRACT

Support for multiple wireless access technologies in a common radio access network is provided. In one aspect, a method of wireless communication includes determining whether to map a shared data channel to at least one resource element. The mapping determination is based at least in part on whether the shared data channel is associated with a legacy wireless technology or an advanced wireless technology. The method further includes transmitting the shared data channel based at least in part on the mapping determination and transmitting a reference signal in the at least one resource element.

37 Claims, 14 Drawing Sheets

(51) Int. Cl.
*H04W 72/12* (2009.01)
*H04W 16/14* (2009.01)
*H04W 48/08* (2009.01)
*H04W 88/10* (2009.01)
*H04L 5/00* (2006.01)

(52) U.S. Cl.
CPC ..... *H04W 28/0252* (2013.01); *H04W 72/1215* (2013.01); *H04L 5/0007* (2013.01); *H04W 16/14* (2013.01); *H04W 48/08* (2013.01); *H04W 72/0446* (2013.01); *H04W 88/10* (2013.01)

(56) References Cited

U.S. PATENT DOCUMENTS

| | | | |
|---|---|---|---|
| 6,842,607 | B2 | 1/2005 | Godfrey et al. |
| 6,876,859 | B2 | 4/2005 | Anderson et al. |
| 7,039,358 | B1 | 5/2006 | Shellhammer et al. |
| 7,050,452 | B2 | 5/2006 | Sugar et al. |
| 7,177,294 | B2 | 2/2007 | Chen et al. |
| 7,193,965 | B1 | 3/2007 | Nevo et al. |
| 7,340,236 | B2 | 3/2008 | Liang et al. |
| 7,735,253 | B2 | 6/2010 | Giebel et al. |
| 7,809,399 | B2 | 10/2010 | Lu et al. |
| 7,924,224 | B2 | 4/2011 | LeFever et al. |
| 8,325,661 | B2 | 12/2012 | Montojo et al. |
| 8,630,242 | B2 * | 1/2014 | Lee et al. ............ 370/329 |
| 2001/0010689 | A1 | 8/2001 | Awater et al. |
| 2002/0101837 | A1 | 8/2002 | Bender et al. |
| 2002/0173272 | A1 | 11/2002 | Liang et al. |
| 2005/0078616 | A1 | 4/2005 | Nevo et al. |
| 2005/0208959 | A1* | 9/2005 | Chen et al. ............ 455/515 |
| 2007/0000943 | A1 | 1/2007 | Morgan |
| 2007/0076649 | A1* | 4/2007 | Lin et al. ............ 370/328 |
| 2007/0076678 | A1 | 4/2007 | Chen et al. |
| 2007/0081489 | A1 | 4/2007 | Anderson et al. |
| 2008/0075032 | A1 | 3/2008 | Balachandran et al. |
| 2008/0101306 | A1 | 5/2008 | Bertrand et al. |
| 2008/0146241 | A1 | 6/2008 | Das et al. |
| 2008/0186692 | A1 | 8/2008 | Mayumi et al. |
| 2008/0186892 | A1 | 8/2008 | Damnjanovic |
| 2008/0233940 | A1 | 9/2008 | Jen |
| 2009/0116434 | A1 | 5/2009 | Lohr et al. |
| 2010/0008445 | A1 | 1/2010 | Khan |
| 2010/0029288 | A1 | 2/2010 | Wang et al. |
| 2010/0091726 | A1 | 4/2010 | Ishii et al. |
| 2010/0157913 | A1 | 6/2010 | Nagata et al. |
| 2011/0085516 | A1* | 4/2011 | Pajukoski et al. ............ 370/330 |
| 2011/0103333 | A1* | 5/2011 | Berggren et al. ............ 370/329 |
| 2011/0116465 | A1 | 5/2011 | Miki et al. |

FOREIGN PATENT DOCUMENTS

| | | |
|---|---|---|
| JP | 2007533248 A | 11/2007 |
| JP | 2008053858 A | 3/2008 |
| JP | 2009512295 A | 3/2009 |
| JP | 2009246501 A | 10/2009 |
| JP | 2009272827 A | 11/2009 |
| JP | 2010504677 A | 2/2010 |
| JP | 2011530946 A | 12/2011 |
| WO | 0120930 A1 | 3/2001 |
| WO | 2005117297 A1 | 12/2005 |
| WO | 2007005181 A2 | 1/2007 |
| WO | 2007031116 A1 | 3/2007 |
| WO | 2007042443 A1 | 4/2007 |
| WO | WO-2008041071 A2 | 4/2008 |
| WO | WO-2010019019 A2 | 2/2010 |

OTHER PUBLICATIONS

3GPP TS 36.913 v8.0.0 "3rd Generation Partnership Project; Technical Specification Group Radio Access Network; Requirements for Further Advancements for E-UTRA (LTE-Advanced) (Release 8)" (Jun. 2008) Chapter 5 of p. 6.

3rd Generation Partnership Project; Technical Specification Group Radio Access Network; Evolved Universal Terrestrial Radio Access (E-UTRA); Physical layer procedures (Release 8), 3GPP TS 36.211 V8.3.0, May 2008.

Motorola, "Long Term Evolution (LTE): A Technical Overview", 2007, pp. 1-15.

Taiwan Search Report—TW098129082—TIPO—Mar. 4, 2013.

International Search Report and Written Opinion—PCT/US2009/055228, International Search Authority—European Patent Office—Feb. 5, 2010.

* cited by examiner

US 9,198,174 B2

SUPPORTING MULTIPLE ACCESS TECHNOLOGIES IN A WIRELESS ENVIRONMENT

CROSS-REFERENCE TO RELATED APPLICATIONS

The present application for patent is a Continuation of U.S. patent application Ser. No. 12/548,075, filed Aug. 26, 2009, entitled "SUPPORTING MULTIPLE ACCESS TECHNOLOGIES IN A WIRELESS ENVIRONMENT," pending, which claims priority to U.S. Provisional Application No. 61/092,456, filed Aug. 28, 2008, entitled "RESERVING RESOURCES FOR TRANSMITTAL OF LTE-A RELATED INFORMATION," all of which are assigned to the assignee hereof and hereby expressly incorporated by reference herein in their entirety.

BACKGROUND

I. Field

The following relates generally to wireless communication, and more specifically to facilitating multiple wireless access technologies over a common terrestrial radio access network.

II. Background

Wireless communication systems are widely deployed to provide various types of communication, for example, voice, data, and so on can be provided by such wireless communication systems. A typical wireless communication system, or network, can provide multiple users access to one or more shared resources (e.g., bandwidth, transmit power, . . . ). For example, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, a wireless multiple-access communication system can simultaneously support communication for multiple access terminals. Each access terminal can communicate with one or more base stations through transmissions on the forward and reverse links. The forward link (or downlink) refers to the communication link from the base stations to the access terminals, and the reverse link (or uplink) refers to the communication link from the access terminals to the base stations. This communication link may be established through a single-in-single-out, multiple-in-single-out, or a multiple-in-multiple-out (MIMO) system.

Wireless communication systems sometimes employ one or more base stations, each base station providing a coverage area. A typical base station can transmit multiple data streams for broadcast, multicast, and/or unicast services, wherein a data stream may be a stream of data that can be of independent reception interest to an access terminal. An access terminal within the coverage area of such base station can be employed to receive one, more than one, or all the data streams carried by a composite stream. Likewise, an access terminal can transmit data to the base station or another access terminal.

Several advancements are currently considered for Long Term Evolution (LTE) advanced system like Multi User MIMO, higher order MIMO (with 8 transmit and receive antennas), Network MIMO, Femto cells with Restricted Association, Pico cells with range extension, larger bandwidths, and the like. LTE advanced has to support legacy UEs (e.g., LTE release 8 UEs) while providing additional features to new UEs (and legacy UEs when possible). However, supporting all features in LTE can put several constraints on LTE advanced design, limiting potential gains and affecting user experience.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with reserving frequency-time block wireless resources for conveying information to new user terminals (e.g., configured for or compatible with an emerging access technology such as LTE-A), while mitigating adverse affects on legacy user terminals (e.g., compatible with existing access technologies such as LTE). Information designated for emerging access technology terminals can be embedded in predetermined reserved locations, such as: a subset of PHICH resource groups; a predetermined number of control channel elements; a subset of resource elements or resource element groups in the control segment; some resources in PDSCH region; one or more resources in MBSFN subframes; a subset of resources in special subframes of frame structure type 2 in a time division duplex (TDD) wireless system, and/or a combination thereof.

In one aspect, a method for wireless communication is disclosed. The method includes determining whether to map a shared data channel to at least one resource element. The mapping determination is based at least in part on whether the shared data channel is associated with one of a legacy wireless technology and an advanced wireless technology. The method also includes transmitting the shared data channel based at least in part on the mapping determination and transmitting a reference signal in the at least one resource element.

In other aspects, an apparatus for wireless communication is disclosed. The apparatus includes means for determining whether to map a shared data channel to at least one resource element. The mapping determination is based at least in part on whether the shared data channel is associated with one of a legacy wireless technology and an advanced wireless technology. The apparatus further includes means for transmitting the shared data channel based at least in part on the mapping determination and means for transmitting a reference signal in the at least one resource element.

In another aspect, a wireless communication apparatus is disclosed. The wireless communications apparatus includes at least one processor coupled to a memory. The at least one processor is configured to determine whether to map a shared data channel to at least one resource element. The mapping determination is based at least in part on whether the shared data channel is associated with one of a legacy wireless technology and an advanced wireless technology. The at least one processor is further configured to transmit the shared data channel based at least in part on the mapping determination and transmit a reference signal in the at least one resource element.

In yet another aspect, a computer program product is disclosed which includes a non-transitory computer-readable medium. The computer-readable medium includes code for causing at least one computer to determine whether to map a shared data channel to at least one resource element. The mapping determination is based at least in part on whether the shared data channel is associated with one of a legacy wireless technology and an advanced wireless technology. The computer-readable medium also includes code for causing the at least one computer to transmit the shared data channel based at least in part on the mapping determination and code for causing the at least one computer to transmit a reference signal (RS) in the at least one resource element.

According to other aspects disclosed herein, a method for wireless communication includes receiving a shared data channel. A mapping of the shared data channel to at least one resource element is based at least in part on whether the shared data channel is associated with one of a legacy wireless technology and an advanced wireless technology. The method further includes receiving a reference signal in the at least one resource element.

In another aspect, an apparatus for wireless communication is disclosed. The apparatus includes means for receiving a shared data channel. A mapping of the shared data channel to at least one resource element is based at least in part on whether the shared data channel is associated with one of a legacy wireless technology and an advanced wireless technology. The apparatus also includes means for receiving a reference signal in the at least one resource element.

In still another aspect, a wireless communication apparatus is disclosed which includes at least one processor coupled to a memory. The at least one processor is configured to receive a shared data channel. A mapping of the shared data channel to at least one resource element is based at least in part on whether the shared data channel is associated with one of a legacy wireless technology and an advanced wireless technology. The at least one processor is further configured to receive a reference signal in the at least one resource element.

In yet another aspect, a computer program product comprising a non-transitory computer-readable medium is disclosed. The computer-readable medium includes code for causing at least one computer to receive a shared data channel. A mapping of the shared data channel to at least one resource element is based at least in part on whether the shared data channel is associated with one of a legacy wireless technology and an advanced wireless technology. The computer-readable medium further includes code for causing the at least one computer to receive a reference signal in the at least one resource element.

To the accomplishment of the foregoing and related ends, the one or more aspects comprise features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
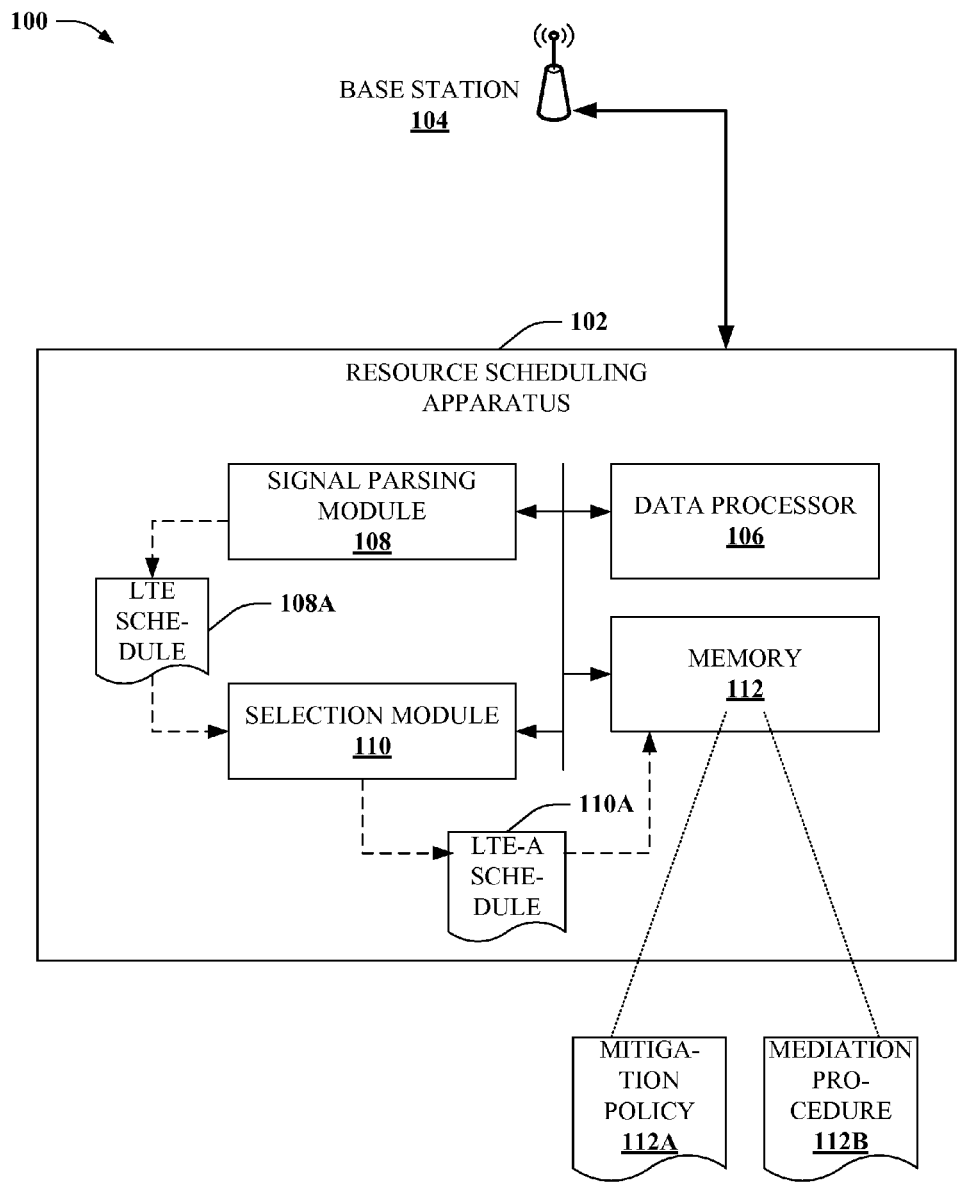
FIG. 1 illustrates a block diagram of an example apparatus that supports multiple wireless access technologies for a network base station.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, it should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of supporting user terminals configured for different wireless access technologies in a common wireless communication environment. One skilled in the art should appreciate that similar techniques could apply to other communication environments.

Advances in wireless communication technology have been diverse in recent years. Some advances affect handset terminals, enabling greater processing power and memory, more powerful and diverse applications, multiple antennas or antenna types, and so on. Other advances affect access network technology, providing higher bandwidth communication, more reliable data rates, multi-user support, and so on. Regardless of the type or nature of these advancements, new software and communication protocols are often necessary to take advantage of additional capabilities. For instance, if a base station is installed with multiple physical antennas, and improved signal processing allows for lower interference and diversity transmission/reception, multiple-input multiple-output (MIMO) technology can be employed to achieve greatly improved data rates. However, new software might be needed to implement the MIMO technology; for instance, to allocate time-frequency resources to MIMO-capable user terminals (UTs). In addition, the software may distinguish between a MIMO-capable UT and a legacy (non-MIMO) UT, to continue to support legacy UTs in a MIMO-capable wireless environment.

In general, reserving resources can occur without legacy terminals being affected by the reserved locations, and hence their associated performances are typically not hampered. Put differently, in at least one aspect the subject innovation exploits behavior of legacy user terminals in expecting information at specific locations of a collection of OFDM symbols. Thus, information can be supplied to other user terminals at different resource locations—enabling implementation of new standards or protocols on these different resource locations, while mitigating performance degradation for legacy terminals. Hence, a wireless communication apparatus as described herein can accommodate multiple wireless access technologies concurrently.

As one particular example of the foregoing, consider a case where legacy terminals are configured for a third generation partnership project (3GPP) long term evolution (LTE) access technology (or LTE access technology), and new terminals are configured for an advanced LTE (or LTE-A) access technology. In this case, LTE-A UTs can be informed of control, reference signal (RS) or traffic resources reserved for LTE-A UTs through a plurality of mechanisms, such as transmission of a new SIB; through a new common channel (e.g., a BCH) that can be monitored by LTE-A terminals, and so on. Alternatively, or in addition, specific LTE-A UTs or a group of such LTE-A UTs can be informed of the reserved resources by a unicast transmission.

According to particular aspects, the pattern employed for reserved resources can be different across frequency time blocks, or can be adaptive and change over time. Such pattern can be changed based on the number of LTE-A and legacy UTs in the system, as well as their demands. Also, the pattern may be designed based on different criteria deemed important for particular signals being carried on the resources.

Referring now to the drawings, FIG. 1 illustrates a block diagram of an example system 100 that facilitates multiple wireless access technologies for a common wireless network (e.g., a terrestrial radio access network). System 100 can facilitate wireless communications according to different access technologies, depending on capabilities of access terminals served by the system (100). As an example, system 100 can be employed to implement a baseline wireless access technology for a set of legacy access terminals configured for the baseline wireless access technology, and implement an advanced wireless access technology for a second set of access terminals configured for the advanced wireless access technology. As a specific example, system 100 can provide LTE services to a set of LTE terminals and reserve resources for LTE-A communication for LTE-A terminals. Typically, LTE-A and LTE access terminologies do not mix in a single radio access network, since LTE-A specifies higher bandwidth, data rates, antenna diversity, etc., than LTE. Also, resource provisioning for LTE-A can be incompatible with resource provisioning for LTE. System 100 can alleviate many of these problems and enable LTE and LTE-A activity on a single radio access network, as described in more detail below.

System 100 comprises a resource scheduling apparatus 102 coupled with a base station 104. In some aspects, resource scheduling apparatus 102 and base station 104 are a single physical entity. For instance, resource scheduling apparatus 102 can be installed as a hardware or software component of base station 104. In other aspects, resource scheduling apparatus 102 can be located physically remote from base station 104, and can optionally be located at a central server and operate for several base stations (104) (e.g., as part of system controller 1430, see FIG. 14 infra).

Resource scheduling apparatus 102 comprises memory 112 for storing a set of modules 108, 110 configured to provide wireless access to access terminals (ATs) configured for a legacy wireless access technology (e.g., LTE) and ATs configured for an advanced wireless access technology (e.g., LTE-A). Additionally, resource scheduling apparatus 106 can comprise a data processor for executing the set of modules 108, 110. A signal parsing module 108 analyzes resource scheduling for the legacy wireless access technology. Thus, the signal parsing module 108 can be configured to identify a mapping for location or orientation of resource blocks within a wireless signal frame, mapping of orthogonal frequency division multiplex (OFDM) symbols to various control channels, reference channels, or traffic channels, and the like. Additionally, signal parsing module 108 can identify blank resources, which are not employed for legacy wireless access signaling. The mapping(s) can be output into a resource schedule file 108A for the legacy access technology, and provided to a resource selection module 110.

Resource selection module 110 assigns control or RS resources for the advanced wireless access technology. The assignment is typically done according to a performance loss mitigation policy 112A. Generally, the policy 112A is configured to avoid resource conflicts for the legacy access technology and the advanced access technology. Where resource conflicts are not fully avoided, the policy 112A can stipulate a mediation procedure 112B to mitigate performance loss resulting from the conflict. As utilized herein, the term resource conflict can include direct conflicts, where a single resource or resource group is assigned to multiple access technologies concurrently (e.g., a single channel assigned for an LTE function and an LTE-A function), or indirect conflicts, where a resource assignment for one access technology limits full applicability of resources expected by access terminals employing a different access technology. As an example of the latter, also referred to as resource puncturing, reserving a shared channel resource group (RGs) for LTE-A terminals may inhibit maximum data rates for LTE terminals employing shared channel resources, even if the shared channel RG is not currently allocated to LTE signaling.

Various groups of resources can be assigned or reserved for the advanced wireless access technology. Selection of resources depends at least in part on the resource schedule 108A employed for the legacy wireless access technology. For instance, it can be preferred for mitigation policy 112A to reserve a subset of resource blocks (e.g., comprising a group of frequency sub-bands over a group of OFDM symbols in a single signal subframe—e.g., see FIGS. 2-4, infra) for the advanced access technology, that will then not be employed by ATs of the legacy access technology. Within those reserved resource blocks, subsets of time-frequency resources can be allocated to control signals, RSs, or data traffic for the advanced access technology. In this manner, a resource conflict between the legacy and advanced wireless access technologies is unlikely. In other aspects, resource blocks employed by the legacy access technology can be designated as multi-use blocks, and some time-frequency resources of these multi-use blocks allocated to advanced access technology ATs. In this latter case, an indirect resource conflict (or direct resource conflict) is more likely to occur. Accordingly, mitigation policy 112A can stipulate the mediation procedure 112B for this type of resource assignment.

The following discussion describes particular examples for resource selection and reservation according to various exemplary aspects. Time-frequency resources assigned for advanced access technology use can be in a control region or data region of one or more subframes of a wireless signal. In some aspects, the reserved time-frequency resources are in resource blocks assigned for the advanced access technology, but this is not necessary in all cases. For instance, the reserved resources can be assigned to general-purpose resource blocks (usable by any AT served by base station 104), or to control channel resources that are not reserved for any particular AT or type of AT.

In one aspect of the subject disclosure, resource selection module 110 can reserve a subset of physical hybrid automatic repeat request (HARQ) indicator channel (PHICH) resources of base station 104 as wireless resources for advanced access technology ATs. PHICH resources are used to send HARQ acknowledgments corresponding to uplink transmissions of ATs. In this aspect, potential performance impact on legacy ATs can occur. The mediation procedure 112B can be employed to offset this performance impact. In one aspect, the mediation procedure 112B can be employed for scheduling extra PHICH resource groups in addition to PHICH resource groups utilized by the legacy wireless access technology (and possibly the advanced wireless access technology) for Acknowledgements and employing the extra PHICH resource groups for control or RS resources of the advanced wireless access technology. In other words, one possible mediation procedure (112B) is to schedule a total number of PHICH resource groups greater than what is required to support Acknowledgements for both the advanced and legacy wireless access technology.

In an alternative aspect, the mediation procedure 112B can be employed for scheduling AT uplink transmissions in a manner that avoids PHICH conflicts between the legacy and advanced wireless access technologies. Typically, uplink transmissions are mapped to particular PHICH resources for receiving feedback pertaining to those uplink transmissions. Thus, as an example, consider an uplink resource for data transmission, resource A, mapped to a downlink resource for PHICH signaling, resource B. An AT assigned on an uplink to resource A will monitor resource B on a downlink. Conversely, upon receiving data from the AT on uplink resource A, base station 104 will transmit PHICH signals to the AT on downlink resource B. However, it should be appreciated that in a multi-access technology system such as system 100, assigning PHICH groups to the advanced wireless access technology can reduce performance for ATs configured for the legacy wireless access technology. For instance, reducing a number of PHICH groups available for legacy ATs can result in an indirect resource conflict, or resource puncturing. This type of conflict can lead to performance degradation for ATs utilizing PHICH groups for acknowledgments.

To alleviate this problem, the mediation policy 112B can incorporate a mapping of uplink transmissions to PHICH resources to mitigate impact of conflicts between PHICH groups employed by the legacy wireless access technology (e.g., for acknowledgments) and PHICH reserved for the advanced wireless access technology. That is to say, PHICH groups mapped to uplink resources employed by legacy ATs (ATs configured for the legacy wireless access technology) will be less likely to conflict with PHICH groups reserved for the advanced wireless access technology, or PHICH groups employed by advanced ATs (ATs configured for the advanced wireless access technology). As a result, legacy ATs served by base station 104 transmit on uplink resources that are mapped to PHICH groups other than the PHICH resource groups reserved for the advanced wireless access technology. This is possible, for example in LTE, since the PHICH group utilized by an LTE AT is dependent on the uplink resource scheduled to the AT, as described above, and on other AT specific parameters that can be configured by base station 104. In this latter aspect, collision between PHICH groups monitored by the legacy ATs for acknowledgements and PHICH groups reserved for the advanced wireless access technology (for acknowledgments, for control signal or RS transmissions, for data transmissions, and so on) can be mitigated or avoided by mediation policy 112B. Thus, in at least one aspect of the subject disclosure, the mediation procedure comprises mapping access terminals configured for the legacy wireless access technology to uplink resources that correspond to a set of PHICH groups other than the PHICH resource groups reserved for the advanced wireless access technology.

According to another aspect of the subject disclosure, resource selection module 110 can assign a subset of control channel elements (CCEs) employed by a wireless network (and base station 104) to control or RS signals of an advanced wireless access technology. In at least one aspect, resource selection module 110 can ensure that these resources are not employed for physical downlink control channel (PDCCH) transmissions of the legacy wireless access technology (at least as long as the resources are reserved for the advanced wireless access technology, for instance). To illustrate CCE and PDCCH usage, consider an LTE system. In LTE, CCEs are a collection of nine resource element groups (REGs) in a control region of a wireless subframe (e.g., see the control resources of FIG. 2, infra). PDCCH signals are transmitted on an aggregate of 1, 2, 4 or 8 CCEs. In each subframe, the CCEs can be ordered as specified in LTE standards (e.g., LTE release 8) and a PDCCH can be assigned to 1, 2, 4 or 8 contiguous CCEs with this ordering.

Based on the foregoing structure, the resource selection module 110 can choose the first CCE to be used for PDCCH of a legacy AT and an aggregation size (e.g., 1, 2, 4 or 8 CCEs), and avoid conflicts with CCE groups reserved for the advanced wireless access technology. In this manner, base station 104 can continue to serve PDCCH for legacy ATs, while providing some CCE resources for the advanced wireless access technology. Thus, in the context of an LTE system, a subset of the CCEs can be reserved for LTE-A, and remaining CCEs can be employed for PDCCH signals for ATs configured for LTE release 8, or some other version of LTE. CCEs reserved for LTE-A would appear to the LTE Rel 8 ATs as PDCCH resources assigned to other ATs (e.g., other LTE Rel 8 ATs). Hence, the LTE Rel 8 ATs are not impacted by this reservation of CCEs for LTE-A. It should be appreciated that this example can be applied to other combinations of legacy and advanced wireless access technologies combined in a terrestrial radio access network.

Though resource selection module 110 can attempt to avoid conflicts on CCE transmissions as discussed above, performance loss might still result, for instance during peak traffic or high loading periods. To mitigate performance loss of ATs configured for the baseline wireless access technology as a result of reserving CCEs for the advanced wireless access technology, mediation policy 112B can be employed. In this case, mediation policy 112B can specify at least one of: modifying PDCCH signal power for ATs configured for the baseline wireless access technology, modifying a number of REs assigned for transmission of PDCCH for these terminals, or optimizing a PDCCH to CCE mapping for these access terminals. In the latter case, the mediation policy 112B could specify an organization of CCEs used for transmission of PDCCH to the legacy ATs in a manner that optimizes performance (or avoids collision with CCEs reserved for advanced wireless technology).

In yet another aspect, resource selection module 110 can assign control segment resource elements (REs) that are not employed by the legacy wireless access technology for RS, PHICH or physical control format indicator channel (PC-FICH) transmissions, for advanced wireless access technology signals. In other words, REs that are part of CCEs can be reserved for the advanced wireless access technology signals. Furthermore, control symbol REs that are not part of CCEs and not employed for PHICH, PCFICH or RS transmission can be employed for this purpose as well.

If PDCCH signals are mapped to CCEs that contain some reserved REs, the reserved REs can puncture a PDCCH employed by base station 104 (resulting in an indirect resource conflict). ATs configured for the advanced wireless access technology can be configured to identify this type of PDCCH conflict and decode PDCCH to compensate for this conflict. Legacy ATs might not be configured to identify this PDCCH conflict, and may observe performance loss. In such case, mediation procedure 112B can instruct base station 104 to adjust power control for the legacy ATs to compensate for this performance loss. Alternatively, or in addition, mediation procedure 112B can instruct base station 104 to optimize PDCCH to CCE mapping to minimize the performance loss. Alternatively, or in addition, mediation procedure 112B can instruct base station 104 to increase a PDCCH aggregation size to improve the PDCCH performance or decrease the PDCCH aggregation size to avoid conflict with reserved REs In still other aspects, resource selection module 110 can assign physical downlink shared channel (PDSCH) resources for the advanced wireless access technology ATs. As one example, resource selection module 110 assigns control or RS resources to PDSCH REs that could at least partially conflict with data assignments for the legacy wireless access technology. Similar to the control segment REs, discussed above, advanced access technology ATs can identify the conflict and decode the PDSCH in a manner that mitigates performance loss. For legacy ATs not configured to identify the conflict, mediation procedure 112B can instruct base station 104 to avoid scheduling ATs in parts of a frequency band in which reserved REs exist. Additionally, mediation procedure 112B can instruct base station 104 to employ power and rate control to compensate for the conflict, or resource scheduling suitable to minimize impact of the conflict.

As an alternative example, resource selection module 110 assigns the control or RS resources to PDSCH REs reserved for the advanced wireless access technology. In this case, these PDSCH REs can be utilized at least in part for data transmissions of ATs configured for the advanced wireless access technology, as well as control signals or RSs. Reserving the PDSCH REs for the advanced wireless access technology can affect legacy ATs. In this case, mediation procedure 112B can specify a reduced duty cycle for reserving resources for advanced wireless access technology purposes to offset effects on the legacy ATs.

According to at least one additional aspect, resource selection module 110 can assign advanced access technology control or RS resources to non-control symbols of one or more multicast/broadcast single frequency network (MBSFN) subframes of a wireless signal. In LTE, for instance, MBSFN subframes include one or two control symbols, while remaining symbols of these subframes are not assigned a mandated transmission. Legacy ATs typically monitor only the control symbols on MBSFN subframes. It is possible, therefore, to reserve non-control OFDM symbols of MBSFN subframes for advanced access technology ATs without impacting legacy ATs.

In yet another aspect, resource selection module 110 can identify other non-reserved wireless resources specified by resource schedule 108A, and employ these non-reserved wireless resources for the advanced access technology ATs. For instance, a time division duplex (TDD) system comprises special subframes having frame structure type 2. The frame structure type 2 specifies a guard period (GP) field, as well as a downlink part of the special subframe (DwPTS). In one example, resource selection module 110 can configure legacy ATs and advanced access technology ATs with different special subframe resource assignments. As another example, resource selection module 110 can specify a larger GP field for legacy ATs than for advanced access technology ATs. Since ATs generally ignore the GP field, the enlarged part of the GP field can be employed for advanced access technology signaling with little or no impact to legacy AT performance. Additionally, the advanced access technology ATs can be informed of the change in GP by broadcast of a new system information block (SIB) configured for advanced wireless access technology information, ignored by legacy ATs. Thus, resource selection module 110 can assign control or RS resources (or traffic resources) to special downlink or GP field symbols ignored by ATs configured for the legacy wireless access technology in a TDD wireless system, or similar ignored symbols in other systems.

It should be appreciated that the various REs, CCEs, channels, control symbols and subframes that can be utilized for reserving wireless resources for the advanced wireless access technology is not exhaustive. Rather, other resources can be employed that are not expressly articulated herein. In addition, combinations of such resources can also be employed consistent with the scope of the subject disclosure. Additionally, time-varying patterns of resource reservation can be employed by resource scheduling apparatus 102, as is discussed in more detail infra. For instance, a set of resources (e.g., subset of CCEs) can be reserved for advanced wireless access technology transmission every N subframes, where N is an integer. As another example, the frequency location of reserved resources can be cycled through different frequency subbands (e.g., where a subband corresponds to a set of contiguous resource blocks [RBs]) within subframes that contain reserved resources. For instance, it is possible to index different RBs with odd and even indices, and reserve odd index resource blocks (RBs) in one subframe for advanced wireless access technology transmissions and even index RBs in a subsequent subframe (e.g., see FIG. 2, infra). As another example, reserved resources could be cycled through different subbands over different subframes. In yet another example, distributed virtual resource block mapping can be employed in a subframe used for transmission of advanced access technology signals. This example enables good frequency sampling (while minimizing overhead) useful for transmission of RS symbols for different antenna ports. This latter example can also provide good frequency diversity for transmission of control signals.

Figure 2:
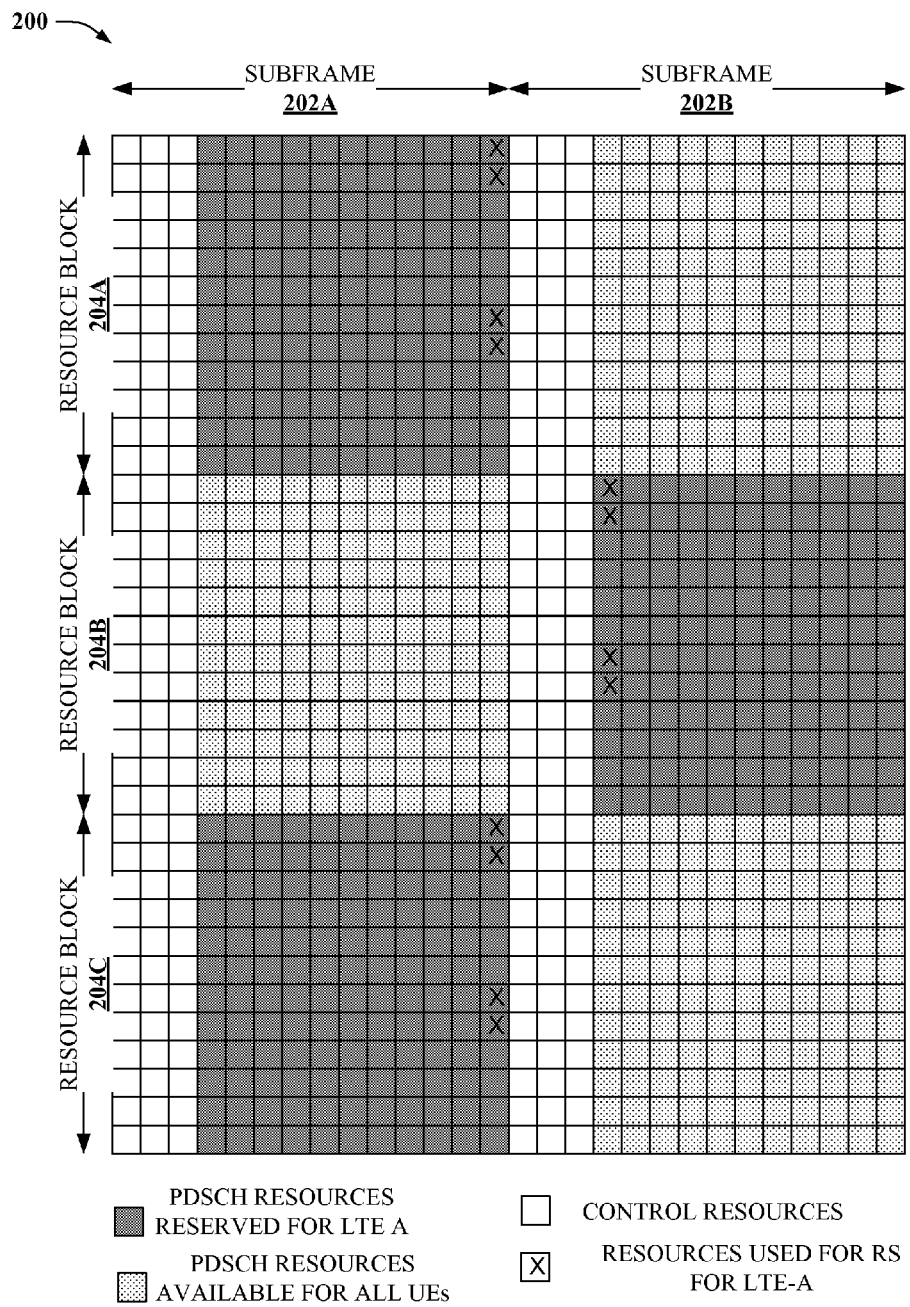
FIG. 2 depicts one example time-frequency resource scheduling permitting multiple wireless access technologies according to one aspect.

FIG. 2 depicts an example time-frequency resource scheduling 200 permitting multiple wireless access technologies according to one aspect. Resource scheduling 200 illustrates a segment of a wireless signal divided in time horizontally, and divided in frequency vertically. Each time-frequency division is a single wireless resource. In addition, blocks of contiguous time and frequency divisions are referred to as subframes (202A, 202B) and RBs (204A, 204B, 204C), respectively.

Specifically, resource scheduling 200 comprises two time subframes 202A and 202B. Each subframe 202A, 202B comprises fourteen OFDM symbols, the first three being control symbol resources (white blocks) and the remaining eleven being resources that can be employed for control, reference or traffic transmissions (dotted or shaded blocks). Additionally, each subframe 202A, 202B includes three RBs 204A, 204B, 204C each comprising twelve contiguous frequency tones. Furthermore, the RBs 204A, 204B, 204C are indexed as follows: RB 204A has index of one, RB 204B has index of two, RB 204C has index of three.

In one aspect of the subject disclosure, subframes 202A, 202B can be dedicated for PDSCH signals, and referred to as PDSCH subframes 202A, 202B. Also as depicted, in the first PDSCH subframe 202A, odd index RBs 204A and 204C are reserved for transmission of advanced wireless access technology signals (e.g., LTE-A signals—depicted by the dark shading), whereas even index RB 204B is available for transmission of signals for ATs employing any type of access technology (e.g., LTE, or LTE-A—depicted by the light shading). In even subframe 202B, an opposite pattern is observed, where odd numbered RBs 204A, 204C are available for any AT, whereas even numbered RB 204B is reserved for advanced wireless access technology ATs.

Additionally, four time-frequency resources reserved for advanced wireless access technology signaling (e.g., odd RBs 204A, 204B in subframe 202A, and even RB 204B in subframe 202B) can be selected specifically for reference signals (RSs). These RS resources are depicted with an 'X' inside of the respective time-frequency resource. As illustrated by resource scheduling 200, equivalently located resources (in the last non-control OFDM symbol) are selected for RS transmissions in both odd index RBs 204A, 204B. However, resources in the even RB 204B of subframe 202B are located in a different position (in the first non-control OFDM symbol). This selection of RS resources is exemplary only, however; other RS resource patterns can be employed, and different numbers of resources can be selected for RS transmissions. However, this selection of RS transmissions enables the RS for advanced wireless access technology signals to span the entire frequency range (all three RBs 204A, 204B, 204C), while enabling legacy wireless access technology transmissions to be scheduled on all subframes without a direct conflict with advanced access technology RS signals.

Figure 3:
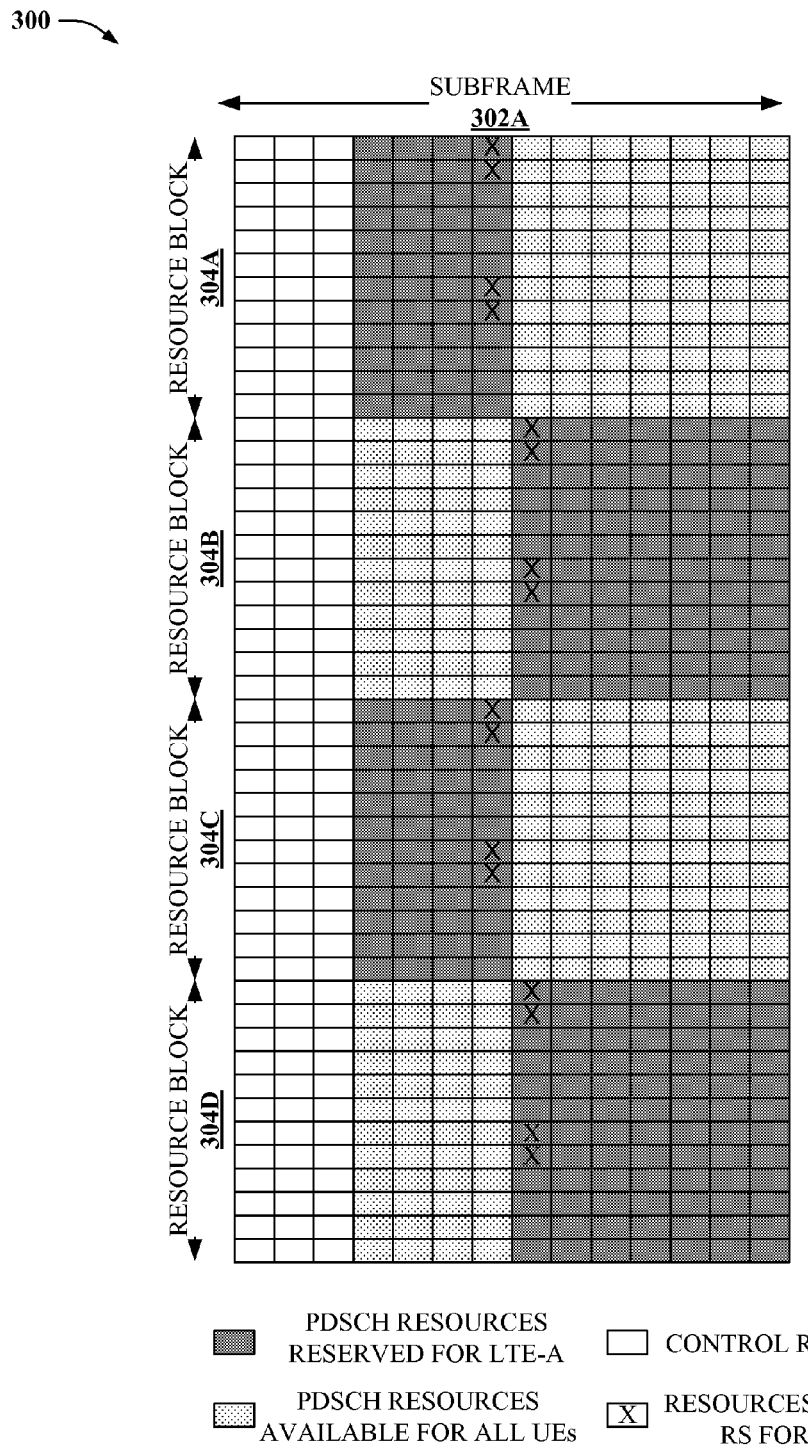
FIG. 3 illustrates a sample time-frequency resource scheduling permitting multiple wireless access technologies according to a further aspect.

FIG. 3 illustrates another example resource scheduling 300 permitting multiple wireless access technologies in a wireless access network. Resource scheduling 300 comprises a different segmentation of time-frequency resources as compared with resource scheduling 200 of FIG. 2, supra. Specifically, resource scheduling 300 depicts a single time subframe 302A with fourteen OFDM symbols and four frequency RBs 304A, 304B, 304C, 304D comprising twelve contiguous frequency tones each. Furthermore, time subframe 302A is divided into three groups of OFDM symbols, control resources in the first three OFDM symbols (white blocks), and two groups of general-purpose resources, of four and seven OFDM symbols, respectively (shaded blocks, both light and dark). In addition, resource scheduling 300 extends across a larger frequency band, comprising four RBs of twelve frequency tones each.

The non-control symbols of resource scheduling 300 are indexed one to four, from top to bottom along the RBs. Specifically, RB 204A has index one, RB 204B has index two, RB 204C has index three, and RB 204D has index four. Additionally, odd index RBs of the first group (comprising four non-control OFDM symbols) are reserved for advanced wireless access technology ATs, whereas even index RBs of the second group (comprising seven non-control OFDM symbols) are reserved for the advanced wireless access technology ATs. In each RB reserved for these ATs, a set of time-frequency symbols are also reserved for RS transmissions. Note that these RS resources are in contiguous OFDM symbols (the seventh and eighth symbols), although they can be in non-contiguous OFDM symbols as well. As in FIG. 2, the advanced access technology RS resources of resource scheduling 300 span the entire frequency range of the wireless signal. When scheduled in frequency hopping mode, the legacy ATs occupy odd (or even) RBs in a first half of subframe 302A and even (or odd) RBs on the second half of subframe 302A. Therefore, legacy ATs can be scheduled in frequency hopping mode in subframe 302A without being punctured by these RS resources. In other words, resources for the legacy ATs can span the entire frequency range as well. This enables optimal performance, and typically allows for little or no performance loss for the legacy ATs.

Figure 4:
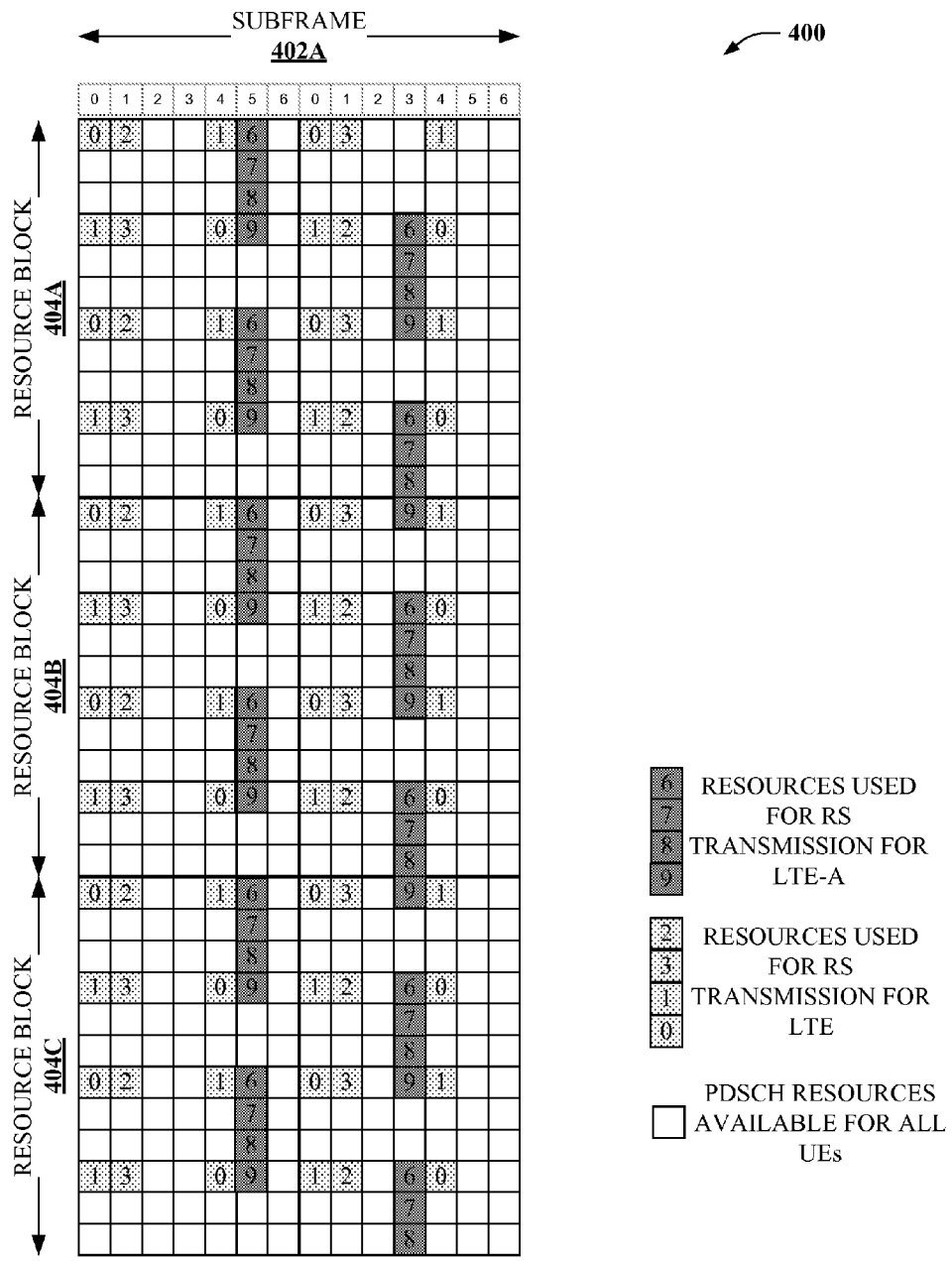
FIG. 4 depicts an example time-frequency resource scheduling enabling multiple wireless access technologies according to yet another aspect.

FIG. 4 illustrates yet another example resource scheduling 400 permitting multiple wireless access technologies according to another aspect. Resource scheduling 400 depicts a single time subframe 402A comprising three frequency RBs 404A, 404B, 404C. In this case, dark-shaded time-frequency resource blocks are reserved for transmission of advanced wireless access technology RSs (e.g., LTE-A RS), whereas light-shaded time-frequency resource blocks are reserved for transmission of legacy wireless access technology RSs (e.g., LTE RS). White blocks are time-frequency resources available for any AT, in this case.

Unlike resource scheduling 200 and 300, the advanced access technology RS transmissions puncture PDSCH transmissions for the legacy access technology, in that these RS transmissions span the entire frequency band. Non-legacy ATs can be configured to identify this condition, and decode data transmissions accordingly, to mitigate performance loss. However, legacy ATs are typically not configured to identify this condition, and can have significant performance loss. To mitigate this performance loss, a mediation procedure (e.g., see FIG. 1 at 112B, supra) can be implemented. The mediation procedure can comprise modifying (e.g., increasing) transmit power, modifying resource scheduling or modifying rate control for legacy access technology transmissions, modifying duty cycle for the advanced access technology resources, or the like, or a combination thereof. For example, low rate legacy ATs can experience smaller performance loss than high rate legacy ATs due to the puncturing. A scheduler (e.g., resource selection module 110, supra), in such a case, can give preference to scheduling low rate legacy ATs on subframes with this puncturing and schedule high rate legacy ATs on other subframes that don't see this puncturing.

Figure 5:
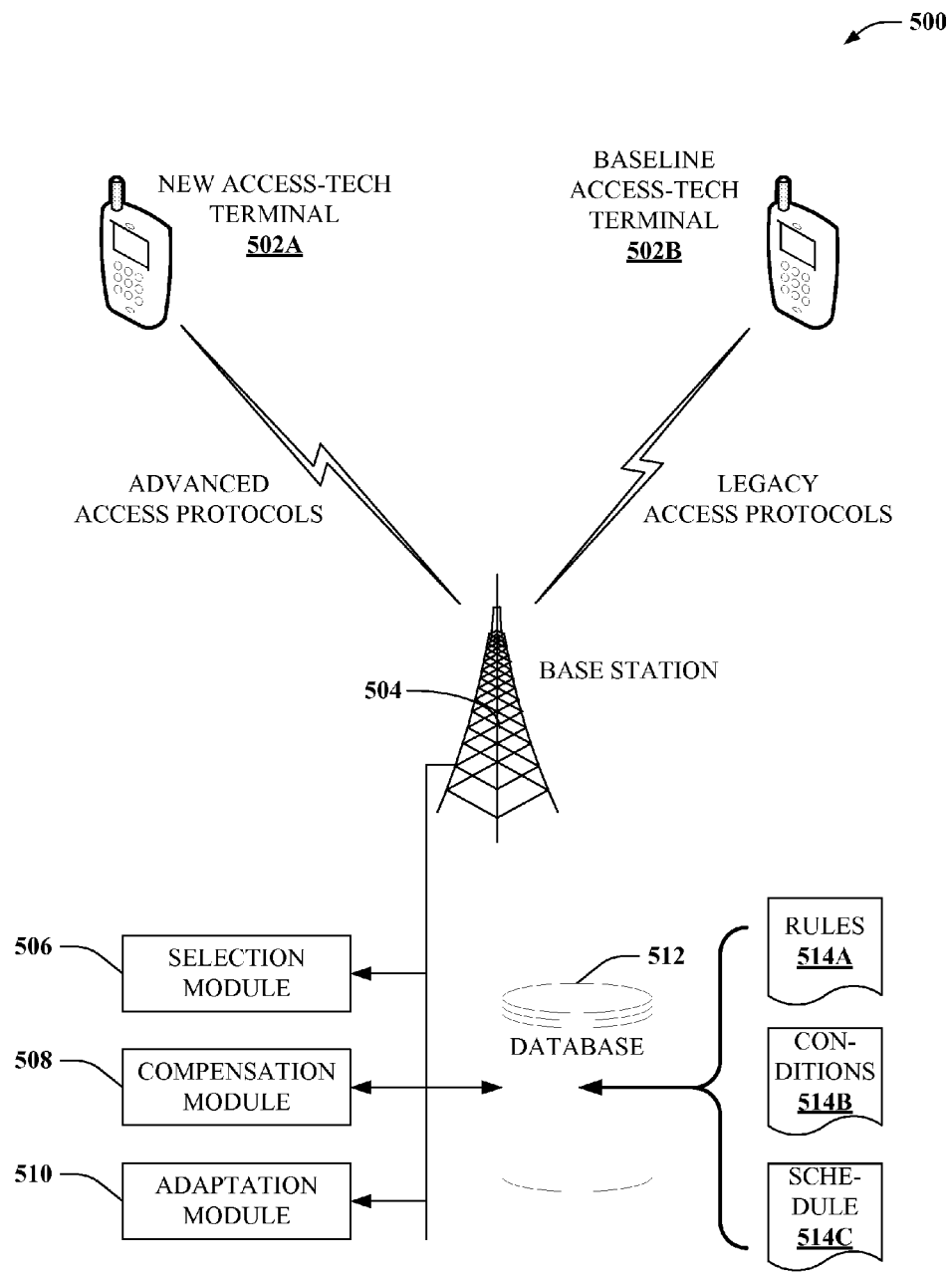
FIG. 5 illustrates a block diagram of a sample system that provides dynamic and adaptive resource scheduling for multiple access technologies.

FIG. 5 illustrates a block diagram of an example system 500 that provides dynamic and adaptive resource scheduling according to aspects of the subject disclosure. Specifically, system 500 can accommodate changing wireless conditions, and adapt a resource scheduling pattern based on such conditions. Accordingly, system 500 can optimize AT performance over time, in various and dynamic wireless conditions.

System 500 comprises a set of ATs 502A, 502B wirelessly coupled with a base station 504. The set of ATs 502A, 502B comprise an AT configured for a baseline wireless access technology 502B, and an AT configured for a second wireless access technology 502A. Each AT 502A, 502B communicates with base station 504 via protocols configured for the access technology employed by the respective ATs. These protocols instruct the ATs 502A, 502B on what resources to employ for various transmission signals, such as reference, control or traffic signals.

Specifically, base station 504 can comprise a selection module 506 that assigns resources among respective types of ATs 502A, 502B, in a similar manner as described for resource selection module 110 of FIG. 1, supra. In at least one aspect of the subject disclosure, resource assignment can be based at least in part on existing wireless conditions observed at the respective ATs and reported to base station 504. These conditions can be stored in a database 512 communicatively coupled with base station 504, in a wireless conditions file 514B.

Based on a type of resource assignment utilized by selection module 506, performance losses can result for the baseline access technology AT 502B. In one example, this performance loss could occur if selection module 506 reserves RS signals for the second wireless access technology in PDSCH subframes that span the entire frequency band utilized by base station 504 (e.g., see resource scheduling 400, supra). Although AT 502A might be configured to detect this type of resource assignment and modify signal decoding to compensate, AT 502B may not have this capability. Thus, AT 502B might observe some performance loss, depending on this resource scheduling. To mitigate or avoid this performance loss, base station 504 can comprise a compensation module 508. Specifically, compensation module 508 can employ power control, rate control or dynamic scheduling based on a mediation procedure to mitigate this performance loss, as described herein. Furthermore, compensation module 508 can reference existing wireless conditions 514B (or historic wireless conditions—derived from updates over time that are stored by database 512) to determine a suitable manner to apply the mediation procedure and optimize the performance loss mitigation.

According to still other aspects of the subject disclosure, base station 504 can comprise an adaptation module 510 that dynamically modifies assignment of resources or resource patterns based on network loading or prevailing wireless conditions. For instance, adaptation module 510 can reference a schedule of reservation patterns 514C and rules 514A for implementing different resource patterns. Example resource reservation patterns can comprise alternating reserved resource blocks every N subframes (e.g., see FIG. 2, supra) or segments of a subframe (e.g., see FIG. 3, supra), cycling through different frequency subbands of reserved RBs, or cycling reserved resources through different subframes, employing a virtual resource block mapping in a reserved subframe (e.g., see FIG. 4, supra), or the like, or a suitable combination thereof. Rules 514A for implementing the various resource reservation patterns 514C can be based on network loading conditions, such as number of advanced access technology ATs (502A) served by base station 504, traffic requirements of those ATs (502A), resources employed for those ATs (502A), and so on. Alternatively, or in addition, the rules 514A can specify a particular resource reservation pattern 514C based on the wireless conditions 514B, including channel interference reported by ATs 502A, 502B, throughput or data rates, signal to noise ratio (SNR), or other measurements of wireless channel strength or quality. Based on current loading or wireless conditions, adaptation module 510 can modify or retain the resource scheduling.

Further to the above, adaptation module 510 can dynamically monitor network loading or wireless conditions (514B) to identify changes over time. Once a threshold change occurs specified by rules 514A, a new resource reservation pattern can be implemented. In this manner, adaptation module 510 can provide a dynamic resource environment optimized for needs of existing ATs 502A, 502B, as well as for prevailing wireless conditions.

Figure 6:
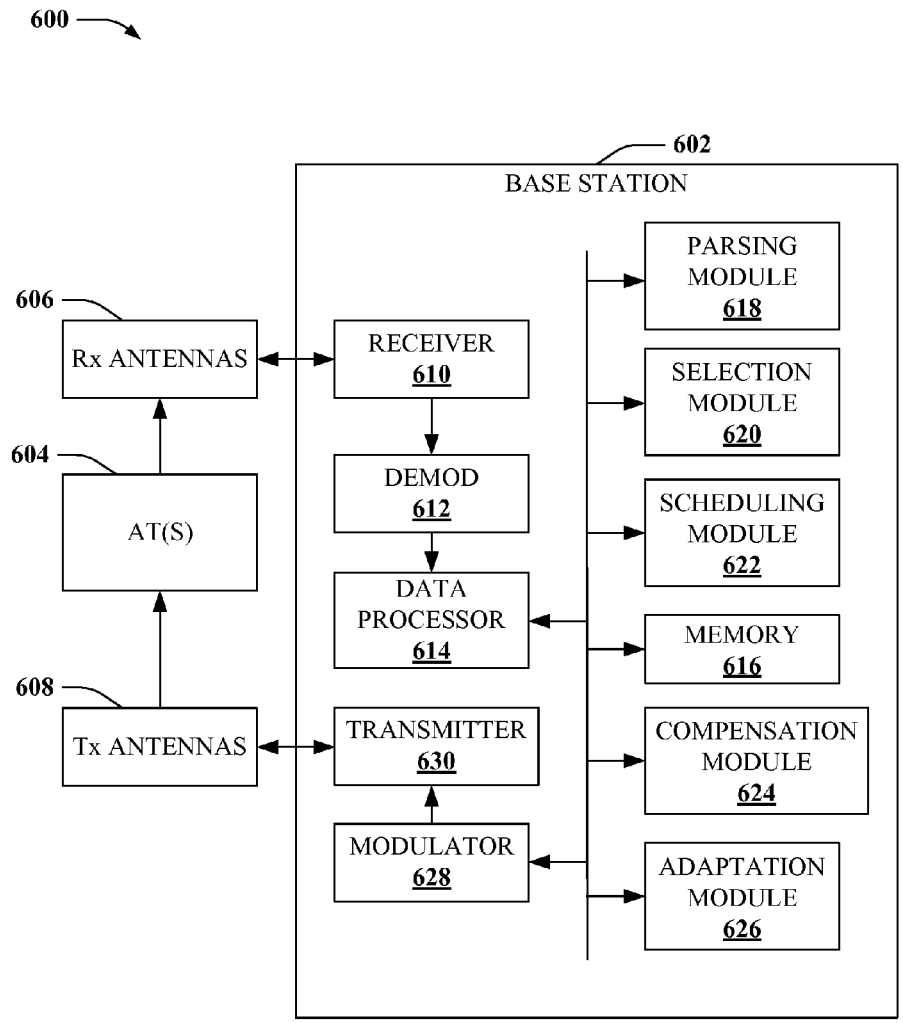
FIG. 6 illustrates a block diagram of an example system comprising a base station configured to support multiple wireless access technologies.

FIG. 6 illustrates a block diagram of an example system 600 comprising a wireless base station 602 configured for aspects of the subject disclosure. As one example, system 600 can comprise a base station 602 that is configured to support AT(s) 604 employing different wireless access technologies. In another example, base station 602 is configured to provide dynamic and adaptive resource reservation to accommodate these wireless access technologies based on changing load or wireless conditions, as described herein.

Base station 602 (e.g., access point, . . . ) can comprise a receiver 610 that obtains wireless signals from one or more of ATs 604 through one or more receive antennas 606, and a transmitter 630 that sends coded/modulated wireless signals provided by modulator 628 to the AT(s) 604 through a transmit antenna(s) 608. Receiver 610 can obtain information from receive antennas 606 and can further comprise a signal recipient (not shown) that receives uplink data transmitted by AT(s) 604. Additionally, receiver 610 is operatively associated with a demodulator 612 that demodulates received information. Demodulated symbols are analyzed by a data processor 614. Data processor 614 is coupled to a memory 616 that stores information related to functions provided or implemented by base station 602. In one instance, stored information can comprise preconfigured patterns for reserving subsets of wireless resources among different wireless access technologies. In addition to the foregoing, memory 616 can comprise rules or protocols for selecting between these preconfigured patterns. Selection can be based on network load, or current traffic requirements of AT(s) 604.

In one particular aspect, base station 602 can comprise a parsing module 618 that analyzes a resource scheduling for a legacy wireless access technology. Further, base station 602 can comprise a selection module 620 that assigns control or RS resources for an advanced wireless access technology according to a performance loss mitigation policy (not depicted). In one aspect, this performance loss mitigation policy specifies control or RS resources that do not conflict with the resource scheduling for the legacy wireless access technology (e.g., based on the analyzed resource scheduling), or specifies implementation of a mediation procedure for control or reference signal resources that do conflict with the resource scheduling. The mediation procedure can be implemented by a compensation module 624 that employs power control, rate control or dynamic scheduling to mitigate performance loss to AT(s) 604 that result from the resource scheduling. In at least one particular aspect, the performance loss mitigation policy specifies an adaptive resource assignment pattern to mitigate performance loss to legacy ATs when resources reserved for the advanced wireless access technology punctures resource expectations of the legacy ATs. The adaptive resource assignment pattern can include at least one of: reserving the control or RS resources (for the advanced wireless access technology) every N subframes (where N is an integer), cycling reservation of the control or RS resources through different parts of a frequency band, cycling reservation of the control or RS resources through different subbands over different subframes, or employing distributed virtual resource block mapping in a subframe employed for the control or RS resources.

In another aspect, base station 602 comprises a scheduling module 622 that sends a message to AT(s) 604 configured for the advanced wireless access technology, specifying location of the control or RS resources assigned by selection module 620. In one configuration, scheduling module 622 broadcasts the message via a SIB dedicated for the AT(s) 604 configured for the advanced wireless access technology. In another configuration, scheduling module 622 broadcasts the message via a common channel that is dedicated for this AT(s) 604. In an alternative configuration, however, scheduling module 622 unicasts the message to one or more of the ATs 604, instead. In another alternative configuration, scheduling module 622 broadcasts or unicasts the message over resources employed by the legacy wireless access technology, instead.

According to at least one aspect, base station 602 can comprise an adaptation module 626. In one example, the adaptation module 626 dynamically modifies assignment of control or RS resources provided by selection module 620 based on network loading or prevailing wireless conditions. As one specific example, the network loading utilized for resource modification comprises a number of access terminals served by base station 602 or an amount of control information to be transmitted to AT(s) 604. In another specific example, the wireless conditions utilized for resource modification include channel performance estimates submitted by AT(s) 604 (which can include ATs configured for the legacy wireless access technology or ATs configured for the advanced wireless access technology). Further, adaptation module 626 can monitor the network loading or wireless conditions and updates the assignment of control or RS resources based on threshold changes in these conditions.

Figure 7:
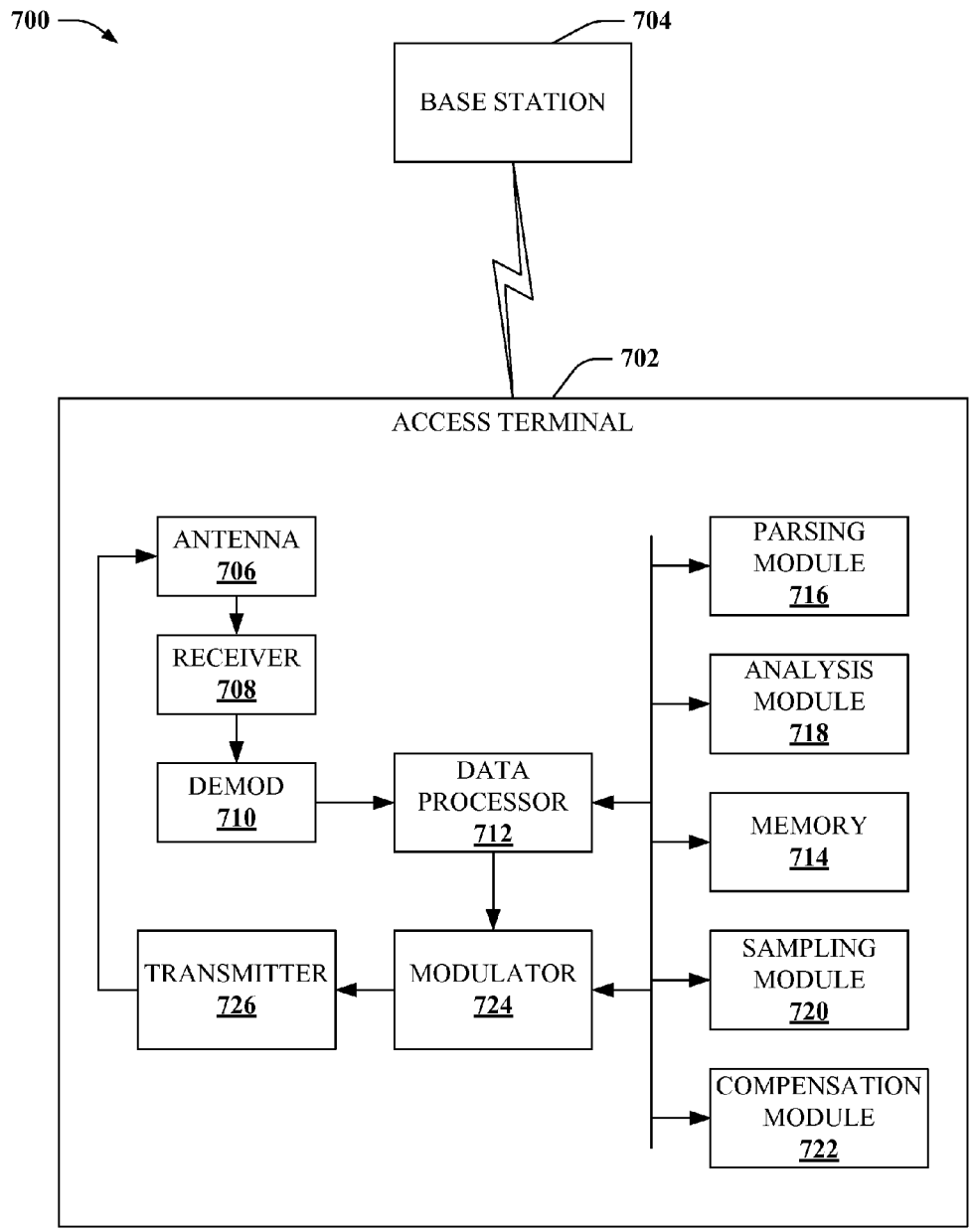
FIG. 7 depicts a block diagram of a sample system comprising a user terminal (UT) that can employ multiple access technologies in wireless communication.

FIG. 7 depicts a block diagram of an example system 700 comprising an AT 702 configured for wireless communication according to aspects of the subject disclosure. AT 702 can be configured to wirelessly communicate with one or more base stations 704 (e.g., access point) of a wireless network. Based on such configuration, AT 702 can receive wireless signals from a base station (704) on a forward link (or downlink) channel and respond with wireless signals on a reverse link (or uplink) channel. In addition, AT 702 can comprise instructions stored in memory 714 for analyzing received wireless signals, specifically, for identifying resource conflicts in wireless resource assignments, decoding signals in a manner that mitigates performance loss due to the resource conflicts, sampling existing wireless conditions and submitting a report of sampled conditions, or the like, as described in more detail below.

AT 702 includes at least one antenna 706 (e.g., a wireless transmission/reception interface or group of such interfaces comprising an input/output interface) that receives a signal and receiver(s) 708, which perform typical actions (e.g., filters, amplifies, down-converts, etc.) on the received signal. In general, antenna 706 and a modulator 724 and transmitter 726 can be configured to send wireless data to base station(s) 704.

Antenna 706 and receiver(s) 708 can also be coupled with a demodulator 710 that can demodulate received symbols and provide such signals to a data processor(s) 712 for evaluation. It should be appreciated that data processor(s) 712 can control and/or reference one or more components (706, 708, 710, 714, 716, 718, 720, 722) of AT 702. Further, data processor(s) 712 can execute one or more modules, applications, engines, or the like (716, 718, 720, 722) that comprise information or controls pertinent to executing functions of the AT 702. For instance, such functions can include receiving and decoding wireless signals, identifying resource assignments from such signals, analyzing conditions of observed wireless channels, submitting channel information to base station 704, implementing resource optimization based on such statistics, or the like.

Additionally, memory 714 of AT 702 is operatively coupled to data processor(s) 712. Memory 714 can store data to be transmitted, received, and the like, and instructions suitable to conduct wireless communication with a remote device (804). Specifically, the instructions can be utilized to implement the various functions described above, or elsewhere herein. Further, memory 714 can store the modules, applications, engines, etc. (716, 718, 720, 722) executed by data processor(s) 712, above.

According to one example operation of AT 702, wireless receiver 708 obtains a scheduling policy for an LTE access technology, and demodulator 710 decodes the scheduling policy for data processor 712. Additionally, data processor 712 can execute a set of modules (716, 718, 720, 722) configured for employing LTE-A access technology in conjunction with the LTE technology. Specifically, a parsing module 716 is executed and extracts an LTE-A scheduling policy from a scheduling message provided by base station 704. Furthermore, an analysis module 718 is executed and examines the LTE-A scheduling policy. Additionally, analysis module 718 identifies a resource scheduling for LTE-A traffic pertaining to AT 702.

The LTE-A scheduling policy can employ one of a set of resource reservation patterns for control or RS resources. In one instance, the LTE-A scheduling policy includes an assignment of LTE-A control or RS resources to at least one of: every N subframes of a wireless signal, a series of different frequency subbands in different signal subframes containing LTE-A transmissions, a series of different parts of a frequency subband, or a distributed virtual resource block in at least one of the different signal subframes containing LTE-A transmissions. It should be appreciated that a combination of the foregoing resource reservation patterns can be employed as well.

In one aspect of the subject disclosure, parsing module 716 obtains the scheduling message in a unicast message sent by base station 704 to AT 702. In another aspect, the scheduling message is sent on a SIB or control channel dedicated for LTE-A traffic, or optionally the scheduling message can be sent on at least one resource employed for LTE traffic. In an alternative aspect, AT 702 is pre-loaded with the LTE-A scheduling policy, and parsing module 716 obtains the LTE-A scheduling policy from a preconfigured memory setting (714). In yet another aspect, parsing module 716 further obtains periodic or triggered updates to the LTE-A scheduling policy. The updates can be based on current network load, or prevailing wireless conditions. Further, data processor 712 updates the LTE-A scheduling policy to coordinate resource scheduling between AT 702 and base station 704, and to take advantage of resource optimizations generated for the current network load and prevailing wireless conditions.

Further to the above, AT 702 can comprise a sampling module 720 that estimates wireless conditions at the wireless receiver 708. Based on this estimation, sampling module 720 submits a wireless condition estimate to base station 704 to facilitate dynamic and adaptive LTE-A scheduling. The submission can also be employed to trigger an updated resource reservation pattern, depending on wireless conditions specified in the estimate, for instance.

In at least one further aspect, AT 702 can comprise a compensation module 722. Compensation module 722 can be configured to identify resource assignment conflicts resulting from a multi-access technology implementation employed by base station 704. Where such conflicts are identified, compensation module can attempt to alleviate performance loss that might result there from. As one illustrative example, compensation module 722 identifies LTE-A control or RS transmissions that at least partially interfere with data traffic pertaining to AT 702. This interference can be identified by cross-referencing the LTE-A scheduling with the LTE scheduling policy. Additionally, compensation module 722 adjusts signal decoding to alleviate performance loss based on this partial interference.

The aforementioned systems have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include AT 702, base station 602, and resource scheduling apparatus 102, or a different combination of these or other modules. Sub-modules could also be implemented as modules communicatively coupled to other modules rather than included within parent modules. Additionally, it should be noted that one or more modules could be combined into a single module providing aggregate functionality. For instance, signal parsing module 108 can include selection module 110, or vice versa, to facilitate determining a baseline access technology scheduling and establishing an advanced access technology scheduling by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 8:
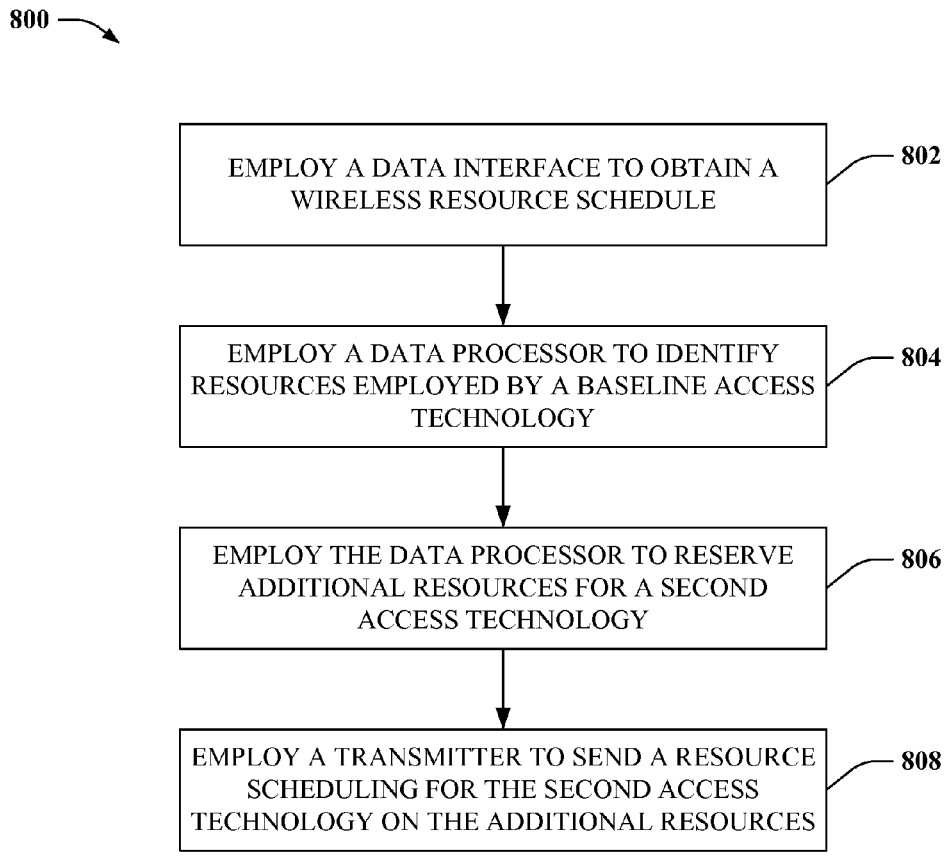
FIG. 8 illustrates a flowchart of an example methodology for supporting multiple access technologies in a wireless communication environment.
Figure 9:
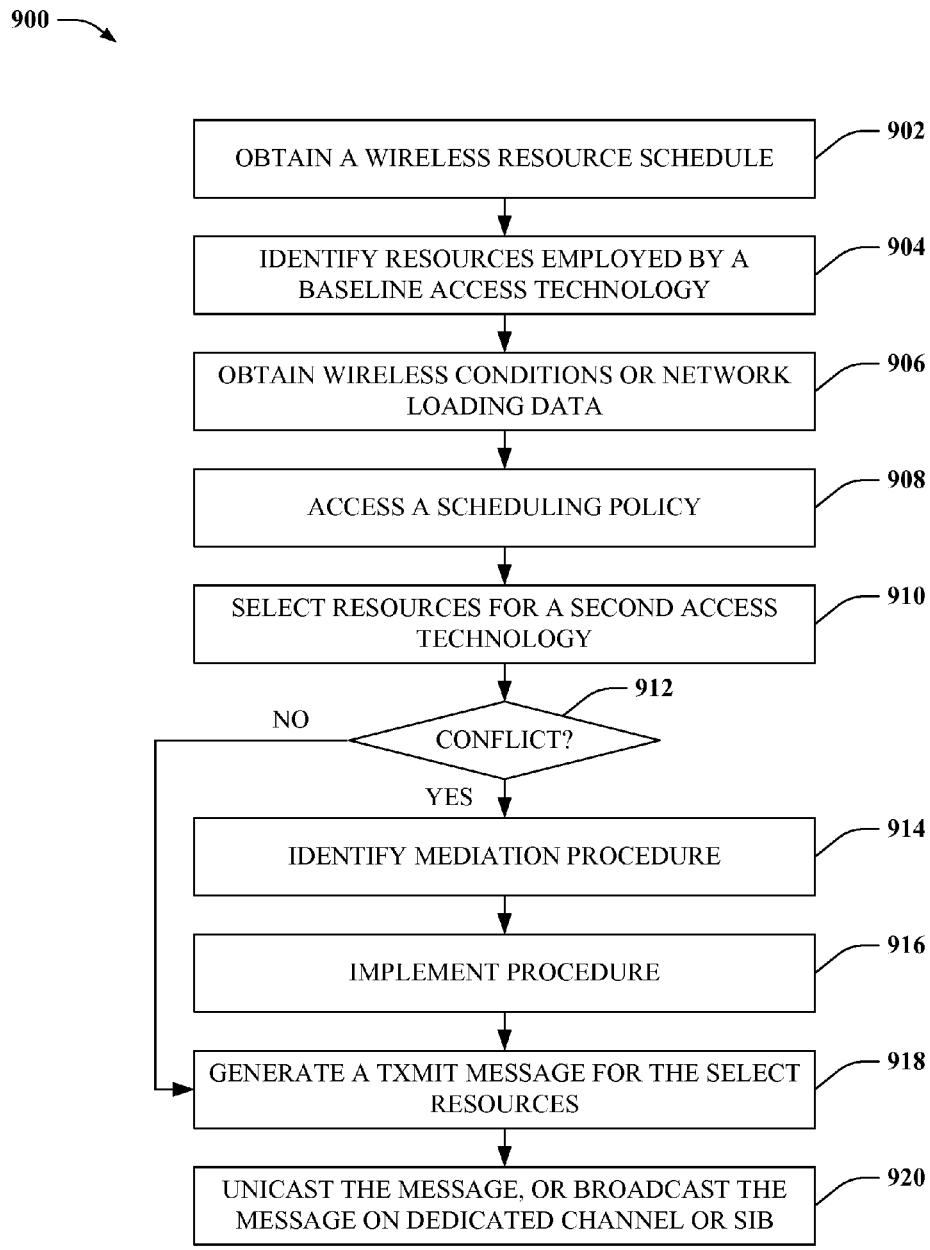
FIG. 9 illustrates a flowchart of a sample methodology for providing adaptive resource scheduling in supporting LTE and LTE-A terminals.
Figure 10:
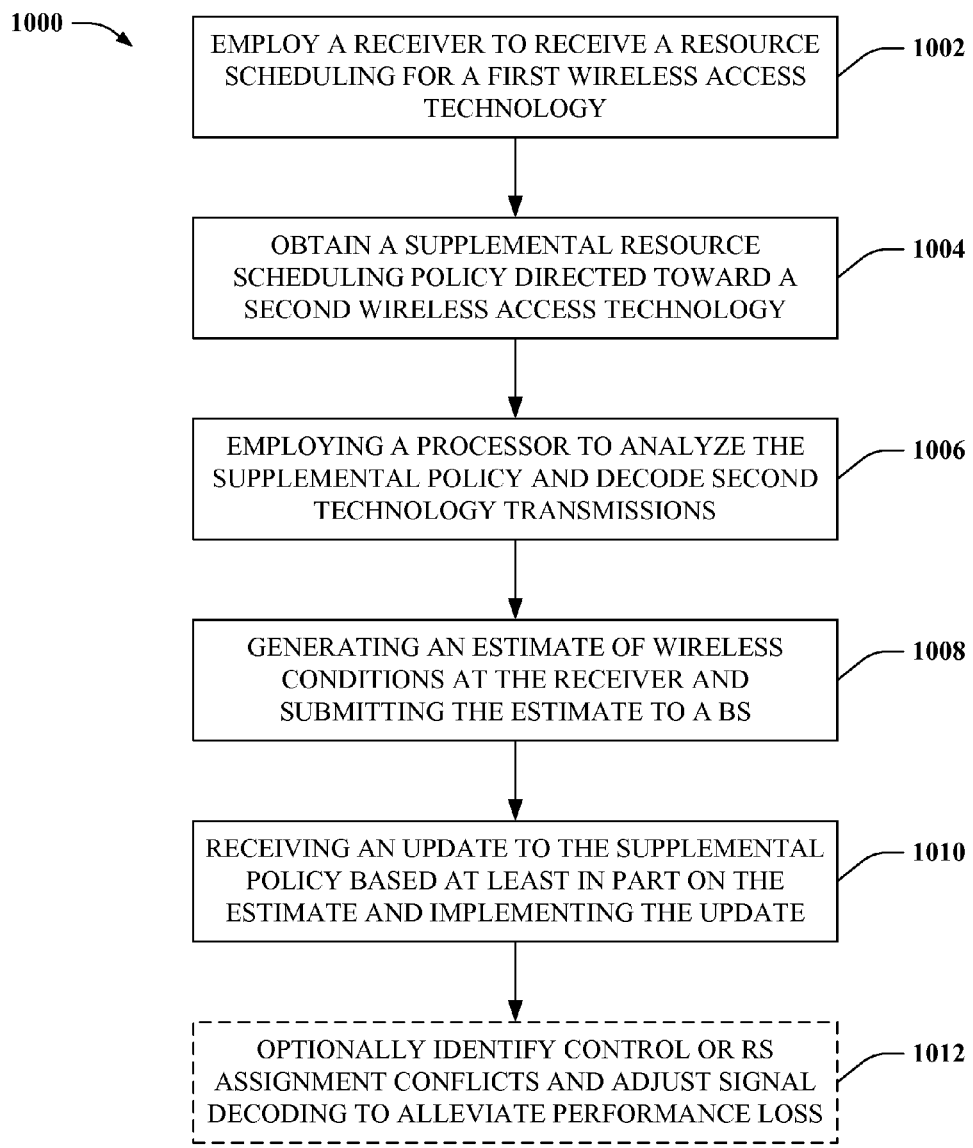
FIG. 10 depicts a flowchart of an example methodology for employing an advanced wireless access technology in an environment supporting legacy terminals.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 8 depicts a flowchart of an example methodology for providing multiple access technologies at a common wireless access network. At 802, method 800 can employ a data interface to obtain a wireless resource schedule for wireless resources of a wireless network. The data interface can be any suitable wired or wireless communication interface. The wireless resources correspond to the sum total of wireless communication resources usable by the wireless network. These resources can include time-frequency resources in an OFDM network, code and spreading factor resources in a code division multiple access (CDMA) network, time slots and subslots of a time division duplex (TDD) network, and so forth. The wireless resource schedule corresponds to an existing allocation of the wireless network's resources. For instance, the wireless resource schedule can be for a baseline (or existing) wireless access technology, such as LTE release 8.

At 804, method 800 can comprise employing the data processor to analyze the wireless resource scheduling and identify wireless signal resources employed by a baseline wireless access technology. Additionally, at 806, method 800 can comprise employing the data processor to reserve a subset of the wireless resources of the wireless network for control or reference signals (RSs) of a second wireless access technology (e.g., an advanced LTE technology, or post-release 8 version of LTE). In one aspect, reserving the resources can further comprise reserving all wireless signal resources of the wireless network for the second wireless access technology for a selected duration (e.g., one subframe) or a selected periodic duration (e.g., selected odd or even numbered subframes—as depicted at FIG. 3, supra). In this aspect, method 800 can employ remaining wireless signal resources (e.g., outside the wireless signal subframe or on alternative even or odd numbered subframes, etc.) to serve the baseline wireless access technology.

Further to the above, employing the data processor to reserve the subset of the wireless resources can further comprise employing at least one of the following for the reserved wireless resources: a subset of PHICH resource groups employed by a wireless network, a subset of CCEs employed by the wireless network, a subset of control segment REs employed by the wireless network, a subset of PDSCH resources employed by the wireless network, or a subset of MBSFN resources employed by the wireless network (e.g., scheduling the subset of MBSFN resources to non-control symbols of MBSFN subframes). In at least one alternative aspect, employing the data processor to reserve the subset of the wireless resources can further comprise employing a downlink part or a GP field of special TDD subframes for the reserved subset of the wireless resources. In this aspect, method 800 can further comprise setting the GP field of TDD subframes employed by access terminals configured for the baseline access technology to a larger value than that for the second wireless access technology and advertising a different number of GP symbols for the baseline wireless access technology and for access terminals of the second wireless access technology. Reserving the subset of the wireless resources can then comprise reserving GP field symbols ignored by these access terminals for the second wireless access technology, for example, by employing extra GP field symbols set for the baseline access technology for the subset of the wireless resources.

In regard to reserving the subset of PHICH resource groups, method 800 can further comprise mitigating performance loss to ATs configured for the baseline wireless access technology. Performance loss can be mitigated by one of: establishing separate PHICH resource groups for the ATs configured for the baseline wireless access technology and ATs configured for a second wireless access technology, or scheduling the ATs configured for the baseline access technology to uplink resources that are mapped to PHICH groups other than the subset of reserved PHICH resource groups. Said differently, the ATs configured for the baseline wireless access technology are scheduled to uplink resources having corresponding PHICH groups that do not conflict with PHICH groups reserved for the second wireless access technology. This can help to alleviate collisions on PHICH groups, mitigating performance loss resulting from those collisions.

With regard to reserving the subset of CCEs, method 800 can further comprise separating the subset of CCEs employed for the reserved subset of wireless resources from CCEs employed for PDCCH signals of the baseline wireless access technology. This can also alleviate performance mitigation resulting from denying use of the subset of CCEs to the ATs configured for the baseline wireless access technology. As an alternative, method 800 can comprise employing one or more REs reserved for PDCCH in a control segment for the subset of the wireless resources. In this latter aspect, mitigating performance loss of access terminals configured for the baseline wireless access technology can comprise at least one of: modifying PDCCH signal power for these access terminals or modifying a number of REs assigned for transmission of PDCCH for these terminals With regard to reserving the subset of PDSCH resources, method 800 can further comprise mitigating performance loss to the ATs configured for the baseline access technology. For instance, if the subset of PDSCH resources are employed for the reserved subset of wireless resources of the wireless network, resource conflicts can occur on the PDSCH, reducing performance. Mitigating the performance loss can comprise at least one of: increasing signal power, or modifying rate control of access terminals configured for the baseline access technology, making a scheduling decision for at least one access terminal configured for the baseline access technology based on expected performance loss for the at least one access terminal, or modifying a duty cycle of the subset of PDSCH resources employed for the subset of the wireless resources.

In addition to the foregoing, at 808, method 800 can comprise employing a wireless transmitter to send a resource scheduling for the control or reference signals of the second wireless access technology over a subset of the additional wireless signal resources not employed by access terminals configured for the baseline wireless access technology. In one example, sending the resource scheduling is further comprising establishing a SIB for the subset of the additional wireless signal resources and transmitting the resource scheduling in the SIB. In another example, sending the resource scheduling is further comprising at least one of reserving a common channel of the wireless network for the second wireless access technology and scheduling the subset of the additional wireless signal resources on the common channel, or transmitting the resource scheduling over at least one resource employed by the baseline wireless access technology. In at least one other example, sending the resource scheduling is further comprising reserving the subset of the wireless resources in a different wireless signal subframe from the wireless signal resources.

FIG. 9 illustrates a flowchart of a sample methodology 900 for enabling multiple wireless access technologies for a common radio access network. At 902, method 900 can comprise obtaining a wireless resource schedule for a baseline wireless access technology. At 904, method 900 identifies resources employed by the baseline access technology from the wireless resource schedule. Additionally, at 906, method 900 can obtain prevailing wireless conditions or network loading data for the radio access network. At 908, method 900 can access a resource scheduling policy. Utilizing the resource scheduling policy and prevailing wireless conditions or network loading data, at 910, method 900 can reserve a subset of wireless resources of a wireless network for a second wireless access technology, as described herein.

According to one aspect, reserving the subset of wireless resources can further comprise dynamically adapting scheduling patterns for reserving the subset of wireless resources. These dynamically adapting scheduling patterns can be based on number of access terminals configured for the second wireless access technology, in one aspect. In another aspect, the scheduling patterns can be based on an amount of control information required to be transmitted to these access terminals. In yet another aspect, the scheduling patterns can be based on particular control resources to be used for transmission of control information.

In further aspects, method 900 can also comprise employing scheduling patterns to reserve resources for the second wireless access technology. For instance, at least one of the following scheduling patterns can be employed: scheduling the subset of wireless resources every N subframes, cycling through different parts of a frequency band on subframes employed for the second wireless access technology, cycling through different subbands over different subframes, or employing distributed virtual resource block mapping in a subframe employed for the second wireless access technology.

At 912, method 900 can determine whether a resource conflict exists, which can result in performance loss for one or more sets of ATs. If the resource conflict exists, method 900 can proceed to 914; otherwise method 900 proceeds to 918.

At 914, method 900 can identify a suitable mediation operation for mitigating performance loss due to the resource conflict. At 916, method 900 can implement the identified procedure. As one example, a suitable mediation procedure can comprise modifying signal power, scheduling or rate control of ATs configured for the baseline wireless access technology, or modifying a duty cycle of resources employed for the second wireless access technology. Other mediation procedure examples (e.g., described at method 800, supra) for various resource types or scheduling patterns can be employed, separately or in suitable combination.

At 918, method 900 can generate a transmission message for the resources selected at reference number 910. Additionally, at 920, method 900 can send the transmission message to ATs configured for the second wireless access technology. The message can be broadcast over a dedicated channel or SIB, or can be unicast to one or a group of such ATs.

FIG. 10 illustrates a flowchart of an example methodology 1000 for participating in a multi-access technology wireless network. At 1002, method 1000 can comprise employing a wireless receiver to receive a resource scheduling policy directed toward a first wireless access technology. Additionally, at 1004, method 1000 can comprise obtaining a supplemental resource scheduling policy directed toward a second wireless access technology. In some aspects, obtaining the supplemental resource scheduling policy further comprises obtaining a unicast message specifying the scheduling policy, or receiving the policy on a SIB or control channel dedicated for the second wireless access technology. In other aspects, obtaining the supplemental resource scheduling policy further comprises obtaining the supplemental resource scheduling policy from a preconfigured setting stored in memory, instead.

At 1006, method 1000 can comprise employing a data processor to analyze the supplemental resource scheduling policy and decode control or RS transmission for the second wireless access technology as specified by the supplemental resource scheduling. In at least one aspect, this supplemental scheduling policy can enable decoding of data transmissions as well as control or RS transmissions, at least in part based on resources specified by the supplemental resource scheduling.

At 1008, method 1000 can comprise generating an estimate of wireless conditions measured at the wireless receiver, and submitting the estimate to a serving base station to trigger an update to the supplemental resource scheduling policy. In at least one particular aspect, at 1010, method 1000 can comprise obtaining periodic or triggered updates (e.g., as a result of multiple estimate submissions) to the supplemental resource scheduling policy, and updating control or RS transmission decoding for the second wireless access technology accordingly. This latter aspect facilitates dynamic and adaptive resource provisioning, optionally based on submitted wireless conditions. At 1012, method 1000 can optionally further comprise identifying control or RS assignments that at least partially interfere with data traffic scheduling. Further, method 1000 can comprise adjusting signal decoding to alleviate performance loss due to the interference.

Figure 11:
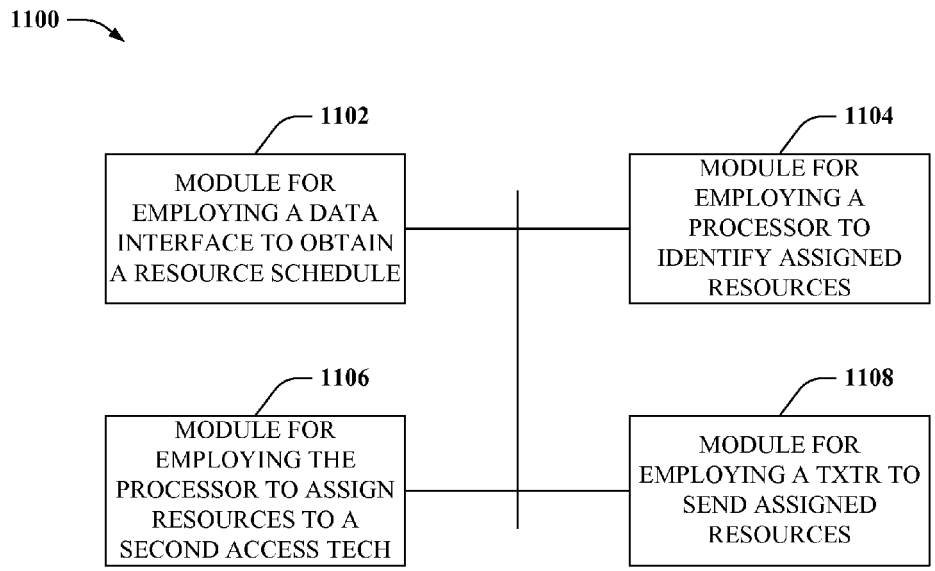
FIGS. 11 and 12 illustrate block diagrams of example systems for providing and facilitating, respectively, multiple wireless access technologies.
Figure 12:
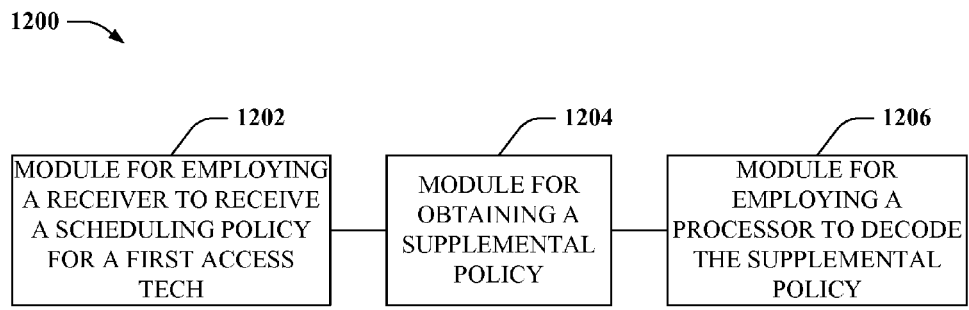

FIGS. 11 and 12 illustrate block diagrams of example systems 1100, 1200 for providing and facilitating, respectively, multiple wireless access technologies. For example, systems 1100 and 1200 can reside at least partially within a wireless communication network and/or within a transmitter such as a node, base station, access point, user terminal, personal computer coupled with a mobile interface card, or the like. It is to be appreciated that systems 1100 and 1200 are represented as including functional blocks, which can be functional blocks that represent functions implemented by a processor, software, or combination thereof (e.g., firmware).

System 1100 can comprise a module 1102 for employing a data interface to obtain a wireless resource schedule. The module 1102 can comprise software or hardware controls or drivers for the data interface, which can include any suitable wired or wireless communication interface. Additionally, system 1100 can comprise a module 1104 for employing a data processor to identify wireless signal resources employed by a baseline wireless access technology from the wireless resource schedule. In at least one aspect, system 1100 can comprise a module 1106 for employing the data processor to reserve a subset of wireless signal resources of a wireless network for control or RSs of a second wireless access technology. The subset of wireless resources can be selected from a particular type(s) of resources in some aspects (e.g., PHICH resources, a subset of CCEs, a subset of control segment REs, a subset of PDCCH resources, a subset of PDSCH resources, a subset of MBSFN subframes, special TDD resources, and so on). Moreover, the wireless resources can be reserved according to a particular resource pattern (e.g., every $N^{th}$ subframe, cycling through different subbands or subframes, according to a distributed virtual resource block mapping, etc.).

Further to the above, system 1100 can comprise a module 1108 for employing a wireless transmitter to send a resource scheduling for the control or RSs of the second wireless access technology over a subset of the subset of the wireless signal resources. Particularly, the subset can include resources not employed by baseline access technology ATs, to avoid conflicts for those ATs.

System 1200 can comprise a module 1202 for employing a wireless receiver to receive a resource scheduling policy directed toward a first wireless access technology. Further, system 1200 can comprise a module 1204 for obtaining a supplemental resource scheduling policy directed toward a second wireless access technology. In addition to the foregoing, system 1200 can comprise a module 1206 for employing a data processor to analyze the supplemental resource scheduling policy and decode control or RS transmissions for the second wireless access technology as specified by the supplemental resource scheduling.

Figure 13:
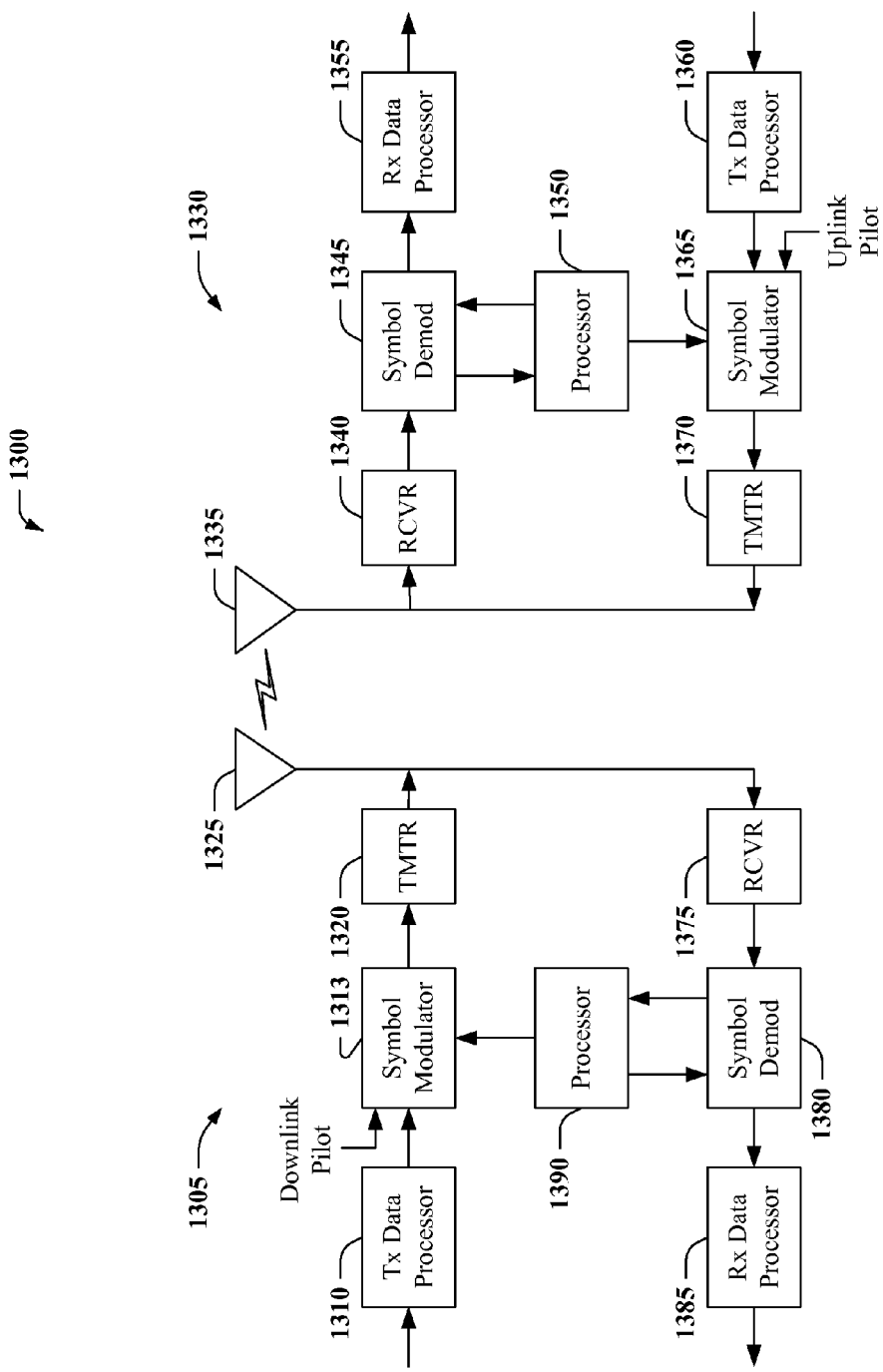
FIG. 13 depicts a block diagram of an example wireless transmit-receive chain facilitating wireless communication according to particular aspects.

FIG. 13 depicts a block diagram of an example system 1300 that can facilitate wireless communication according to some aspects disclosed herein. On a downlink, at access point 1305, a transmit (TX) data processor 1310 receives, formats, codes, interleaves, and modulates (or symbol maps) traffic data and provides modulation symbols ("data symbols"). A symbol modulator 1313 receives and processes the data symbols and pilot symbols and provides a stream of symbols. A symbol modulator 1320 multiplexes data and pilot symbols and provides them to a transmitter unit (TMTR) 1320. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 demodulates and provides received pilot symbols to a processor 1350 for channel estimation. Symbol demodulator 1345 further receives a frequency response estimate for the downlink from processor 1350, performs data demodulation on the received data symbols to obtain data symbol estimates (which are estimates of the transmitted data symbols), and provides the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1313 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 then receives and processes the stream of symbols to generate an uplink signal, which is transmitted by the antenna 1335 to the access point 1305. Specifically, the uplink signal can be in accordance with SC-FDMA requirements and can include frequency hopping mechanisms as described herein.

At access point 1305, the uplink signal from terminal 1330 is received by the antenna 1325 and processed by a receiver unit 1375 to obtain samples. A symbol demodulator 1380 then processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink. Multiple terminals can transmit pilot concurrently on the uplink on their respective assigned sets of pilot sub-bands, where the pilot sub-band sets can be interlaced.

Processors 1390 and 1350 direct (e.g., control, coordinate, manage, etc.) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal. The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1390 and 1350.

Figure 14:
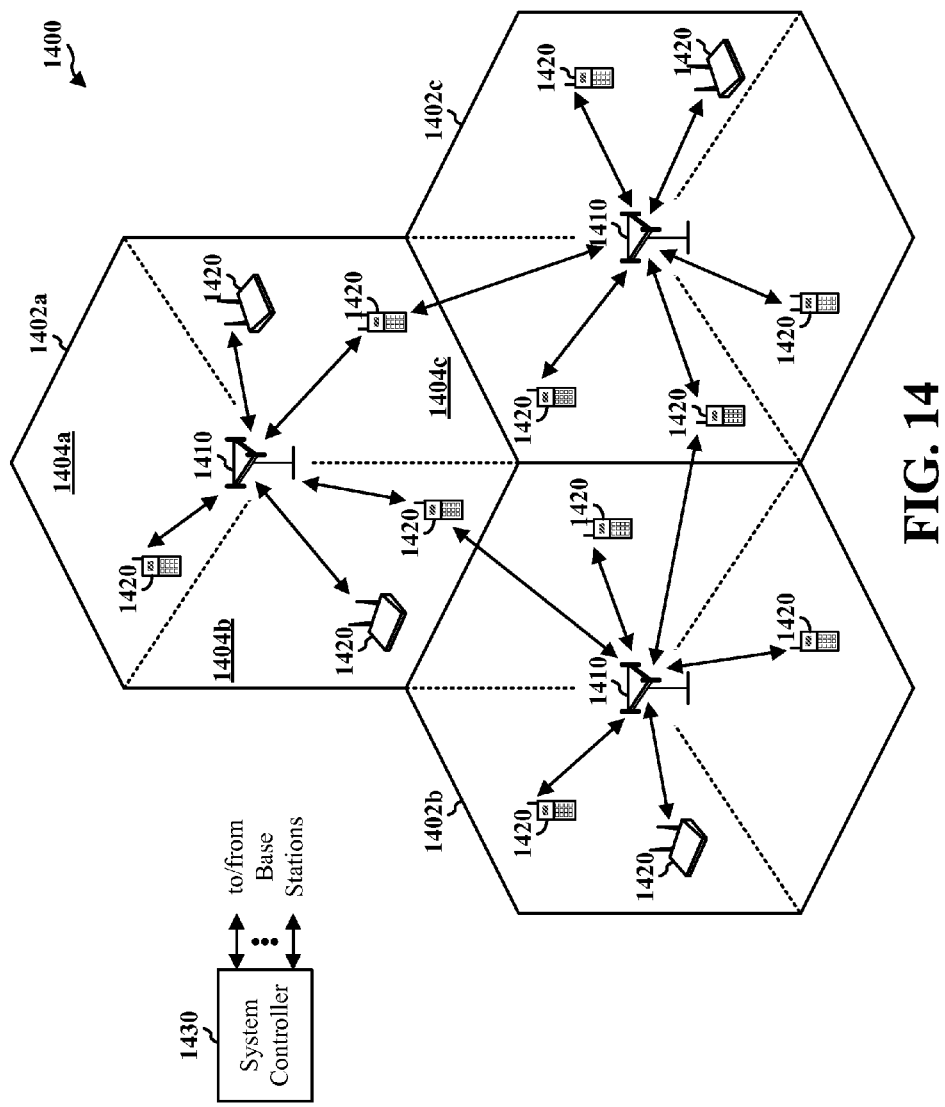
FIG. 14 illustrates a block diagram of a sample cellular communication environment that can be employed in support of various other disclosed aspects.

FIG. 14 illustrates a wireless communication system 1400 with multiple base stations (BSs) 1410 (e.g., wireless access points, wireless communication apparatus) and multiple terminals 1420 (e.g., ATs), such as can be utilized in conjunction with one or more aspects. A BS (1410) is generally a fixed station that communicates with the terminals and can also be called an access point, a Node B, or some other terminology. Each BS 1410 provides communication coverage for a particular geographic area or coverage area, illustrated as three geographic areas in FIG. 14, labeled 1402a, 1402b, and 1402c. The term "cell" can refer to a BS or its coverage area depending on the context in which the term is used. To improve system capacity, a BS geographic area/coverage area can be partitioned into multiple smaller areas (e.g., three smaller areas, according to cell 1402a in FIG. 14), 1404a, 1404b, and 1404c. Each smaller area (1404a, 1404b, 1404c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1420 are typically dispersed throughout the system, and each terminal 1420 can be fixed or mobile. Terminals 1420 can also be called a mobile station, user equipment, a user device, wireless communication apparatus, an access terminal, a user terminal or some other terminology. A terminal 1420 can be a wireless device, a cellular phone, a personal digital assistant (PDA), a wireless modem card, and so on. Each terminal 1420 can communicate with zero, one, or multiple BSs 1410 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1430 couples to base stations 1410 and provides coordination and control for BSs 1410. For a distributed architecture, BSs 1410 can communicate with one another as needed (e.g., by way of a wired or wireless backhaul network communicatively coupling the BSs 1410). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 15:
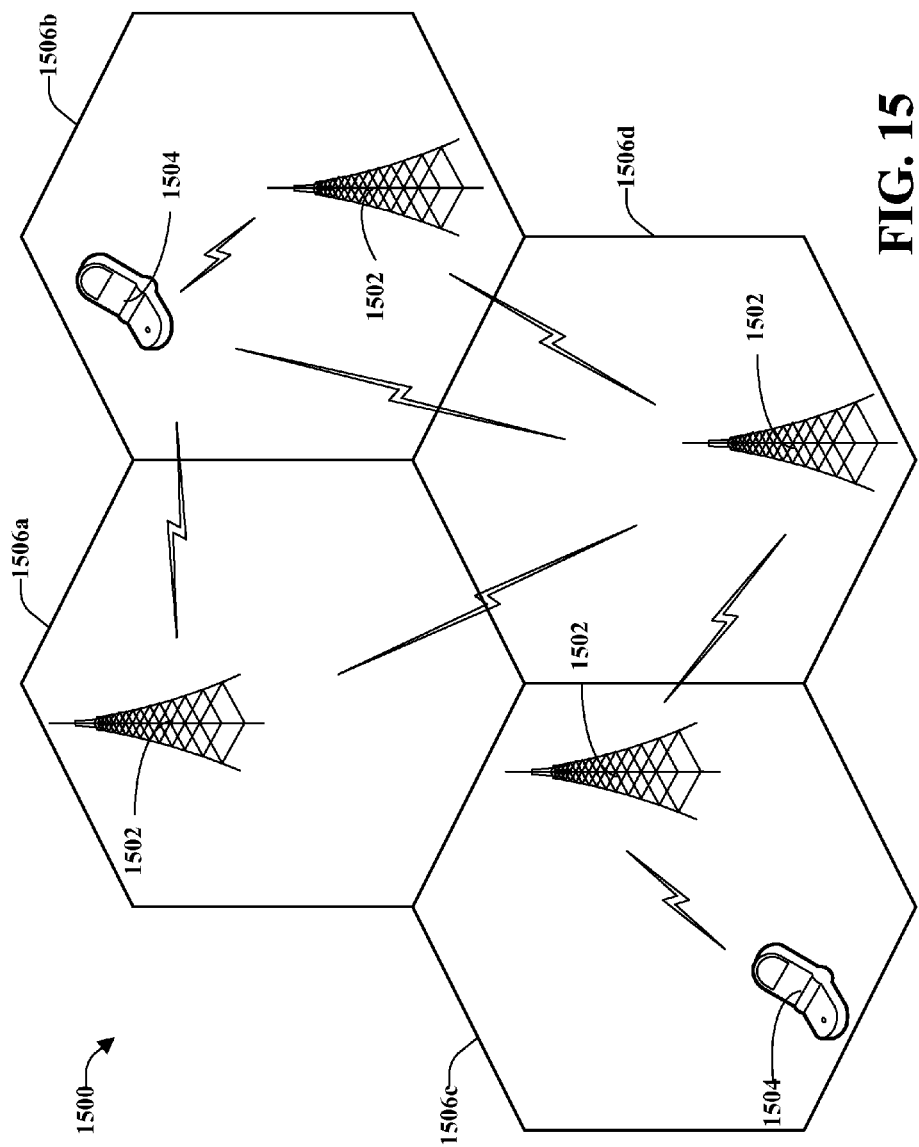
FIG. 15 depicts a block diagram of an example wireless communication environment according to at least one other disclosed aspect.

FIG. 15 is an illustration of a planned or semi-planned wireless communication environment 1500, in accordance with various aspects. System 1500 can comprise one or more BSs 1502 in one or more cells and/or sectors that receive, transmit, repeat, etc., wireless communication signals to each other and/or to one or more mobile devices 1504. As illustrated, each BS 1502 can provide communication coverage for a particular geographic area, illustrated as four geographic areas, labeled 1506a, 1506b, 1506c and 1506d. Each BS 1502 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 7, supra), as will be appreciated by one skilled in the art. Mobile devices 1504 can be, for example, cellular phones, smart phones, laptops, handheld communication devices, handheld computing devices, satellite radios, global positioning systems, PDAs, or any other suitable device for communicating over wireless communication environment 1500. System 1500 can be employed in conjunction with various aspects described herein in order to facilitate improved resource management in wireless communications, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a user equipment (UE). A UE can also be called a system, a subscriber unit, a subscriber station, mobile station, mobile, mobile communication device, mobile device, remote station, remote terminal, access terminal (AT), user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for wireless communication, comprising:
   determining whether to map a shared data channel to a time-frequency resource element, the mapping determination being based at least in part on whether the shared data channel is associated with one of a legacy wireless technology and an advanced wireless technology;
   transmitting the shared data channel based at least in part on the mapping determination; and
   transmitting a reference signal (RS) in the time-frequency resource element.

2. The method of claim 1, wherein the shared data channel is a physical downlink shared channel (PDSCH); and
   the method further comprising not mapping the PDSCH to the time-frequency resource element if the PDSCH is for a user equipment (UE) configured for the advance wireless technology.

3. The method of claim 1, wherein the shared data channel is a physical downlink shared channel (PDSCH);

the method further comprising mapping the PDSCH to the time-frequency resource element if the PDSCH is for a user equipment (UE) configured for the legacy wireless technology; and
wherein the time-frequency resource element carries the RS.

4. The method of claim 1, further comprising mitigating performance loss of a user equipment (UE) configured for the legacy wireless technology by at least one of:
increasing a transmit power of the shared data channel;
modifying a rate control of the UE;
scheduling the UE based on the mapping determination; or
reducing a duty cycle of the RS.

5. The method of claim 1, wherein the legacy wireless technology includes Long Term Evolution (LTE) and the advanced wireless technology includes LTE-Advanced (LTE-A).

6. The method of claim 1, further comprising mapping the shared data channel to one or more resource elements that are non-overlapping with the at least one resource element used for the RS.

7. An apparatus for wireless communication, comprising:
means for determining whether to map a shared data channel to a time-frequency resource element, the mapping determination being based at least in part on whether the shared data channel is associated with one of a legacy wireless technology and an advanced wireless technology;
means for transmitting the shared data channel based at least in part on the mapping determination; and
means for transmitting a reference signal (RS) in the time-frequency resource element.

8. The apparatus of claim 7, wherein the shared data channel is a physical downlink shared channel (PDSCH); and
wherein the PDSCH is not mapped to the time-frequency resource element if the PDSCH is for a user equipment (UE) configured for the advance wireless technology.

9. The apparatus of claim 7, wherein the shared data channel is a physical downlink shared channel (PDSCH);
wherein the PDSCH is mapped to the time-frequency resource element if the PDSCH is for a user equipment (UE) configured for the legacy wireless technology; and
wherein the time-frequency resource element carries the RS.

10. The apparatus of claim 7, further comprising means for mitigating performance loss of a user equipment (UE) configured for the legacy wireless technology by at least one of:
means or increasing a transmit power of the shared data channel;
means for modifying a rate control of the UE;
means for scheduling the UE based on the mapping determination; or
means for reducing a duty cycle of the RS.

11. The apparatus of claim 7, further comprising means for mapping the shared data channel to one or more resource elements that are non-overlapping with the at least one resource element used for the RS.

12. An wireless communication apparatus, comprising:
determining whether to map a shared data channel to a time-frequency resource element, the mapping determination being based at least in part on whether the shared data channel is associated with one of a legacy wireless technology and an advanced wireless technology;
transmitting the shared data channel based at least in part on the mapping determination; and
transmitting a reference signal (RS) in the time-frequency resource element.

13. The apparatus of claim 7, wherein the shared data channel is a physical downlink shared channel (PDSCH); and
wherein the at least one processor is further configured to map the PDSCH to the time-frequency resource element if the PDSCH is for a user equipment (UE) configured for the advance wireless technology.

14. The apparatus of claim 7, wherein the shared data channel is a physical downlink shared channel (PDSCH);
wherein the at least one processor is further configured to map the PDSCH to the time-frequency resource element if the PDSCH is for a user equipment (UE) configured for the legacy wireless technology; and
wherein the time-frequency resource element carries the RS.

15. The wireless communication apparatus of claim 12, wherein the at least one processor is further configured to mitigate performance loss of a user equipment (UE) configured for the legacy wireless technology by at least one of:
increasing a transmit power of the shared data channel;
modifying a rate control of the UE;
scheduling the UE based on the determining; or
reducing a duty cycle of the RS.

16. The wireless communication apparatus of claim 12, wherein the at least one processor is further configured to map the shared data channel to one or more resource elements that are non-overlapping with the at least one resource element used for the RS.

17. A computer program product for wireless communication, comprising:
a non-transitory computer-readable medium, comprising:
code for causing at least one computer to determine whether to map a shared data channel to a time-frequency resource element, the mapping determination being based at least in part on whether the shared data channel is associated with one of a legacy wireless technology and an advanced wireless technology;
code for causing the at least one computer to transmit the shared data channel based at least in part on the mapping determination; and
code for causing the at least one computer to transmit a reference signal (RS) in the time-frequency resource element.

18. The computer program product of claim 17, wherein the shared data channel is a physical downlink shared channel (PDSCH); and
wherein the PDSCH is not mapped to the time-frequency resource element if the PDSCH is for a user equipment (UE) configured for the advance wireless technology.

19. The computer program product of claim 17, wherein the shared data channel is a physical downlink shared channel (PDSCH);
wherein the PDSCH is not mapped to the time-frequency resource element if the PDSCH is for a user equipment (UE) configured for the legacy wireless technology; and
wherein the time-frequency resource element carries the RS.

20. The computer program product of claim 17, wherein the non-transitory computer-readable medium further includes code for causing the at least one computer to map the shared data channel to one or more resource elements that are non-overlapping with the at least one resource element used for the RS.

21. A method for wireless communication, comprising:
receiving a shared data channel, wherein a mapping of the shared data channel to a time-frequency resource element is based at least in part on whether the shared data channel is associated with one of a legacy wireless technology and an advanced wireless technology; and receiving a reference signal (RS) in the time-frequency resource element.

22. The method of claim 21, wherein the shared data channel is a physical downlink shared channel (PDSCH); and wherein the PDSCH is not mapped to the time-frequency resource element if the PDSCH is for a user equipment (UE) configured for the advance wireless technology.

23. The method of claim 21, wherein the shared data channel is a physical downlink shared channel (PDSCH);
wherein the PDSCH is mapped to the time-frequency resource element if the PDSCH is for a user equipment (UE) configured for the legacy wireless technology; and
wherein the time-frequency one resource element carries the RS.

24. The method of claim 21, wherein the shared data channel is mapped to one or more resource elements that are non-overlapping with the at least one resource element used for the RS.

25. The method of claim 21, wherein the legacy wireless technology includes Long Term Evolution (LTE) and the advanced wireless technology includes LTE-Advanced (LTE-A).

26. An apparatus for wireless communication, comprising:
means for receiving a shared data channel, wherein a mapping of the shared data channel to a time-frequency resource element is based at least in part on whether the shared data channel is associated with one of a legacy wireless technology and an advanced wireless technology; and
means for receiving a reference signal (RS) in the time-frequency resource element.

27. The apparatus of claim 26, wherein the shared data channel is a physical downlink shared channel (PDSCH); and wherein the PDSCH is not mapped to the time-frequency resource element if the PDSCH is for a user equipment (UE) configured for the advance wireless technology.

28. The apparatus of claim 26, wherein the shared data channel is a physical downlink shared channel (PDSCH); wherein the PDSCH is mapped to the at least one resource element if the PDSCH is for a user equipment (UE) configured for the legacy wireless technology; and wherein the time-frequency resource element carries the RS.

29. A wireless communication apparatus, comprising:
at least one processor configured to:
receive a shared data channel, wherein a mapping of the shared data channel to at least one resource element is based at least in part on whether the shared data channel is associated with one of a legacy wireless technology and an advanced wireless technology, and
receive a reference signal (RS) in the at least one resource element; and
a memory coupled to the at least one processor.

30. The wireless communication apparatus of claim 29, wherein the shared data channel is a physical downlink shared channel (PDSCH); and
wherein the PDSCH is not mapped to the at least one resource element if the PDSCH is for a user equipment (UE) configured for the advance wireless technology.

31. The wireless communication apparatus of claim 29, wherein the shared data channel is a physical downlink shared channel (PDSCH);
wherein the PDSCH is mapped to the at least one resource element if the PDSCH is for a user equipment (UE) configured for the legacy wireless technology; and
wherein the at least one resource element carries the RS.

32. The wireless communication apparatus of claim 29, wherein the shared data channel is mapped to one or more resource elements that are non-overlapping with the at least one resource element used for the RS.

33. A computer program product, comprising:
a non-transitory computer-readable medium, comprising:
code for causing at least one computer to receive a shared data channel, wherein a mapping of the shared data channel to a time-frequency resource element is based at least in part on whether the shared data channel is associated with one of a legacy wireless technology and an advanced wireless technology, and
code for causing the at least one computer to receive a reference signal (RS) in the time-frequency resource element.

34. The computer program product of claim 33, wherein the shared data channel is a physical downlink shared channel (PDSCH); and
wherein the PDSCH is not mapped to the time-frequency resource element if the PDSCH is for a user equipment (UE) configured for the advance wireless technology.

35. The computer program product of claim 33, wherein the shared data channel is a physical downlink shared channel (PDSCH); wherein the PDSCH is mapped to the time-frequency resource element if the PDSCH is for a user equipment (UE) configured for the legacy wireless technology; and
wherein the time-frequency resource element carries the RS.

36. The computer program product of claim 33, wherein the shared data channel is mapped to one or more resource elements that are non-overlapping with the at least one resource element used for the RS.

37. The computer program product of claim 33, wherein the legacy wireless technology includes Long Term Evolution (LTE) and the advanced wireless technology includes LTE-Advanced (LTE-A).

* * * * *